US012671483B2

(12) United States Patent
Yang et al.

(10) Patent No.: US 12,671,483 B2
(45) Date of Patent: Jun. 30, 2026

(54) SSB SPECIFIC PRACH CONFIGURATION

(71) Applicant: Nokia Technologies Oy, Espoo (FI)

(72) Inventors: Roy Yang, Buffalo Grove, IL (US);
Axel Mueller, Paris (FR); Kevin Wanuga, Souderton, PA (US);
Shashika Manosha Kapuruhamy Badalge, Oulu (FI)

(73) Assignee: Nokia Technologies Oy, Espoo (FI)

( * ) Notice: Subject to any disclaimer, the term of this patent is extended or adjusted under 35 U.S.C. 154(b) by 438 days.

(21) Appl. No.: 18/333,336

(22) Filed: Jun. 12, 2023

(65) Prior Publication Data

US 2023/0403746 A1      Dec. 14, 2023

Related U.S. Application Data

(60) Provisional application No. 63/351,461, filed on Jun. 13, 2022.

(51) Int. Cl.
*H04W 74/08*      (2024.01)
*H04B 7/06*      (2006.01)
(Continued)

(52) U.S. Cl.
CPC ...... *H04B 7/0695* (2013.01); *H04W 56/0015* (2013.01); *H04W 74/0833* (2013.01)

(58) Field of Classification Search
CPC .......... H04W 74/0833; H04W 56/0015; H04B 7/0695; H04B 7/15; H04B 7/06952
See application file for complete search history.

(56) References Cited

U.S. PATENT DOCUMENTS

| | | | |
|---|---|---|---|
| 10,057,923 B2 | 8/2018 | Ratasuk et al. | 74/4 |
| 10,651,913 B2 | 5/2020 | Jeon et al. | 7/626 |

(Continued)

FOREIGN PATENT DOCUMENTS

| | | |
|---|---|---|
| EP | 3 445 123 A1 | 2/2019 |
| EP | 23 17 6889 | 10/2023 |

(Continued)

OTHER PUBLICATIONS

"Design Principles for Random Access Procedure in NR", CATT, 3GPP TSG-RAN WG2 Meeting #97, R2-1700969, Feb. 2017, 3 pages.

(Continued)

*Primary Examiner* — Derrick V Rose
(74) *Attorney, Agent, or Firm* — Robert P. Michal, Esq.; Rimon PC

(57)      ABSTRACT

An apparatus may be configured to: receive information comprising at least: an indication of a first PRACH configuration, wherein the first PRACH configuration is associated with an identifier of at least one first radio beam, and an indication of a second PRACH configuration, at least partially different from the first PRACH configuration, wherein the second PRACH configuration is associated with an identifier of at least one second radio beam, wherein the at least one second radio beam comprises, at least, a radio beam for communicating with a network node via a repeater; select a radio beam; select a PRACH configuration based, at least partially, on the received information; and transmit, to the network node, a radio access preamble on the selected radio beam according to the selected PRACH configuration.

19 Claims, 24 Drawing Sheets

(51) Int. Cl.
    *H04W 56/00*       (2009.01)
    *H04W 74/0833*    (2024.01)

(56)           References Cited

U.S. PATENT DOCUMENTS

| | | | |
|---|---|---|---|
| 10,855,420 B2 | 12/2020 | Park et al. | 5/48 |
| 2011/0014922 A1* | 1/2011 | Jen | H04W 74/0833 |
| | | | 455/450 |
| 2018/0343595 A1 | 11/2018 | Da Silva et al. | 36/77 |
| 2020/0008188 A1 | 1/2020 | Nam et al. | 72/413 |
| 2020/0366363 A1* | 11/2020 | Li | H04W 24/10 |
| 2021/0266982 A1 | 8/2021 | Guo et al. | 74/833 |
| 2021/0298088 A1 | 9/2021 | Qi et al. | 74/833 |
| 2022/0361253 A1* | 11/2022 | Taherzadeh Boroujeni | |
| | | | H04W 74/0833 |
| 2024/0429994 A1* | 12/2024 | Moon | H04W 16/26 |

FOREIGN PATENT DOCUMENTS

| | | |
|---|---|---|
| KR | 102137311 B1 | 7/2020 |
| WO | WO-2021/034247 A1 | 2/2021 |
| WO | WO-2021/219756 A1 | 11/2021 |

OTHER PUBLICATIONS

"Handover command and CSI-RS configuration of target", Ericsson, 3GPP TSG-RAN WG2 #97bis, R2-1702673, Apr. 2017, 5 pages.
Beam Selection for Handover in NR, InterDigital Inc., 3GPP TSG-RAN WG2 Meeting #99bis, R2-1710675, Oct. 2017, 5 pages.

* cited by examiner

FIG. 4a

```
-- ASN1START
-- TAG-RACH-CONFIGCOMMON-START

RACH-ConfigCommon ::=                          SEQUENCE{
    rach-ConfigGeneric                             RACH-ConfigGeneric,
    totalNumberOfRA-Preambles                      INTEGER (1..63)               OPTIONAL,        -- Need S
    ssb-perRACH-OccasionAndCB-PreamblesPerSSB         CHOICE {
        oneEighth           ENUMERATED {n4, n8, n12, n16, n20, n24, n28, n32, n36, n40, n44, n48, n52, n56, n60, n64},
        oneFourth           ENUMERATED {n4, n8, n12, n16, n20, n24, n28, n32, n36, n40, n44, n48, n52, n56, n60, n64},
        oneHalf             ENUMERATED {n4, n8, n12, n16, n20, n24, n28, n32, n36, n40, n44, n48, n52, n56, n60, n64},
        one                 ENUMERATED {n4, n8, n12, n16, n20, n24, n28, n32, n36, n40, n44, n48, n52, n56, n60, n64},
        two                 ENUMERATED {n4, n8, n12, n16, n20, n24, n28, n32},
        four                INTEGER (1..16),
        eight               INTEGER (1..8),
        sixteen             INTEGER (1..4)                                       OPTIONAL,        -- Need M
    }
}
```

FIG. 6

| PRACH Configuration Index | Preamble format 1210 | $n_f \bmod x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration 1220 |
|---|---|---|---|---|---|---|---|---|
| | | $x$ | $y$ | | | | | |
| 97 | A2 | 1 | 0 | 7 | 0 | 1 | 3 | 4 |
| 120 | A3 | 1 | 0 | 7 | 0 | 1 | 2 | 6 |

FIG. 12

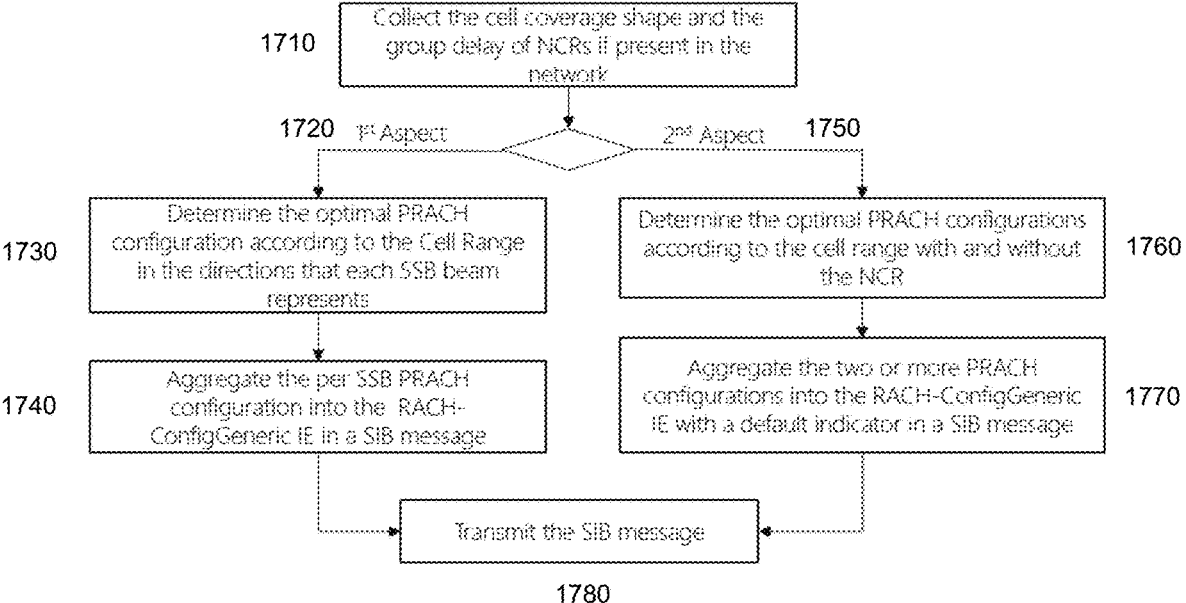

1710  Collect the cell coverage shape and the group delay of NCRs if present in the network 1720  1ˢᵗ Aspect          2ⁿᵈ Aspect  1750

1730  Determine the optimal PRACH configuration according to the Cell Range in the directions that each SSB beam represents 1760  Determine the optimal PRACH configurations according to the cell range with and without the NCR 1740  Aggregate the per SSB PRACH configuration into the RACH-ConfigGeneric IE in a SIB message 1770  Aggregate the two or more PRACH configurations into the RACH-ConfigGeneric IE with a default indicator in a SIB message 1780  Transmit the SIB message

FIG. 17

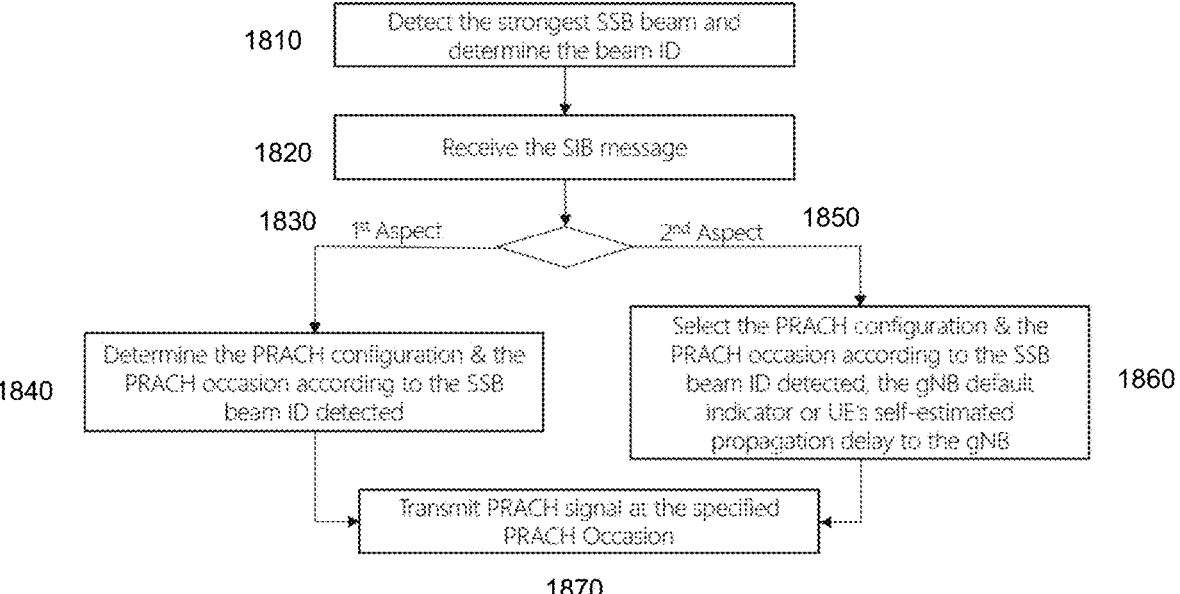

1810  Detect the strongest SSB beam and determine the beam ID

1820  Receive the SIB message 1830  1st Aspect          2nd Aspect  1850

1840  Determine the PRACH configuration & the PRACH occasion according to the SSB beam ID detected 1860  Select the PRACH configuration & the PRACH occasion according to the SSB beam ID detected, the gNB default indicator or UE's self-estimated propagation delay to the gNB 1870  Transmit PRACH signal at the specified PRACH Occasion

FIG. 18

```
-- ASN1START
-- TAG-RACH-CONFIGGENERIC-START
```

1970
```
RACH-ConfigGeneric ::=                   SEQUENCE{
        perSSBRAConfigurationList          PerSSBRAConfigurationList
```
1960
```
        prach-SlotConfigurationIndex       INTEGER (0..255),
        msg1-FDM                                   ENUMERATED {one, two, four, eight),
        msg1-FrequencyStart                INTEGER(0..maxNrofPhysicalResourceBlocks-1),
        zeroCorrelationZoneConfig          INTEGER (0..15),
        preambleReceivedTargetPower        INTEGER (-202..-60),
        preambleTransMax                           ENUMERATED {n3, n4, n5, n6, n7, n8, n10,
n20, n50, n100, n200},
        powerRampingStep                           ENUMERATED {dB0, dB2, dB4, dB6},
        ra-ResponseWindow                          ENUMERATED {sl1, sl2, sl4, sl8, sl10, sl20,
sl40, sl80},
        ...,
}
```
1910
```
PerSSBRAConfigurationList ::=      SEQUENCE (SIZE (1..maxSSB)) OF
PerSSBRAConfiguration
```

1920
```
PerSSBRAConfiguration ::=         SEQUENCE {
```
1930
```
        per-formatConfigurationIndex       INTEGER (0..255),
        zeroCorrelationZoneConfig                  INTEGER (0..15),
        associatedSSBList                          AssociatedSSBList
}
```
1940
1950

```
AssociatedSSBList ::=              SEQUENCE (SIZE (1..maxSSB)) OF SSB-Index {
        ssb-Index                          SSB-Index
}
```

```
--TAG-RACH-CONFIGGENERIC-STOP
--ASN1STOP
```

FIG. 19

```
-- ASN1START
-- TAG-RACH-CONFIGGENERIC-START

RACH-ConfigGeneric ::=                SEQUENCE{
        perSSBRAConfigurationList         PerSSBRAConfigurationList
        msg1-FDM                              ENUMERATED {one, two, four, eight},
        msg1-FrequencyStart                   INTEGER (0..maxNrofPhysicalResourceBlocks-1),
        zeroCorrelationZoneConfig             INTEGER (0..15),
        preambleReceivedTargetPower       INTEGER (-202..-60),
        preambleTransMax                      ENUMERATED {n3, n4, n5, n6, n7, n8, n10,
n20, n50, n100, n200},
        powerRampingStep                      ENUMERATED {dB0, dB2, dB4, dB6},
        ra-ResponseWindow                     ENUMERATED {sl1, sl2, sl4, sl8, sl10, sl20,
sl40, sl80},
        ...,
}
PerSSBRAConfigurationList ::=      SEQUENCE (SIZE (1..maxSSB)) OF
PerSSBRAConfiguration PerSSBRAConfiguration ::=             SEQUENCE {
        prach-ConfigurationIndex              INTEGER(0..255),
        zeroCorrelationZoneConfig             INTEGER (0..15),
        msg1-FrequencyStart                   INTEGER (0..maxNrofPhysicalResourceBlocks-1),
        default-Indicator                     ENUMERATED {zero, one}
}
--TAG-RACH-CONFIGGENERIC-STOP
--ASN1STOP
```

2100 receive information comprising at least:

> an indication of a first physical random access channel configuration, wherein the first physical random access channel configuration is associated with an identifier of at least one first radio beam, and > an indication of a second physical random access channel configuration, wherein the second physical random access configuration is at least partially different from the first physical random access channel configuration, wherein the second physical random access channel configuration is associated with an identifier of at least one second radio beam, wherein the at least one second radio beam comprises, at least, a radio beam for communicating with a network node via a repeater

2110

select a radio beam     2120 select a physical random access channel configuration based, at least partially, on the received information     2130 transmit, to the network node, a radio access preamble on the selected radio beam according to the selected physical random access channel configuration     2140

FIG. 21

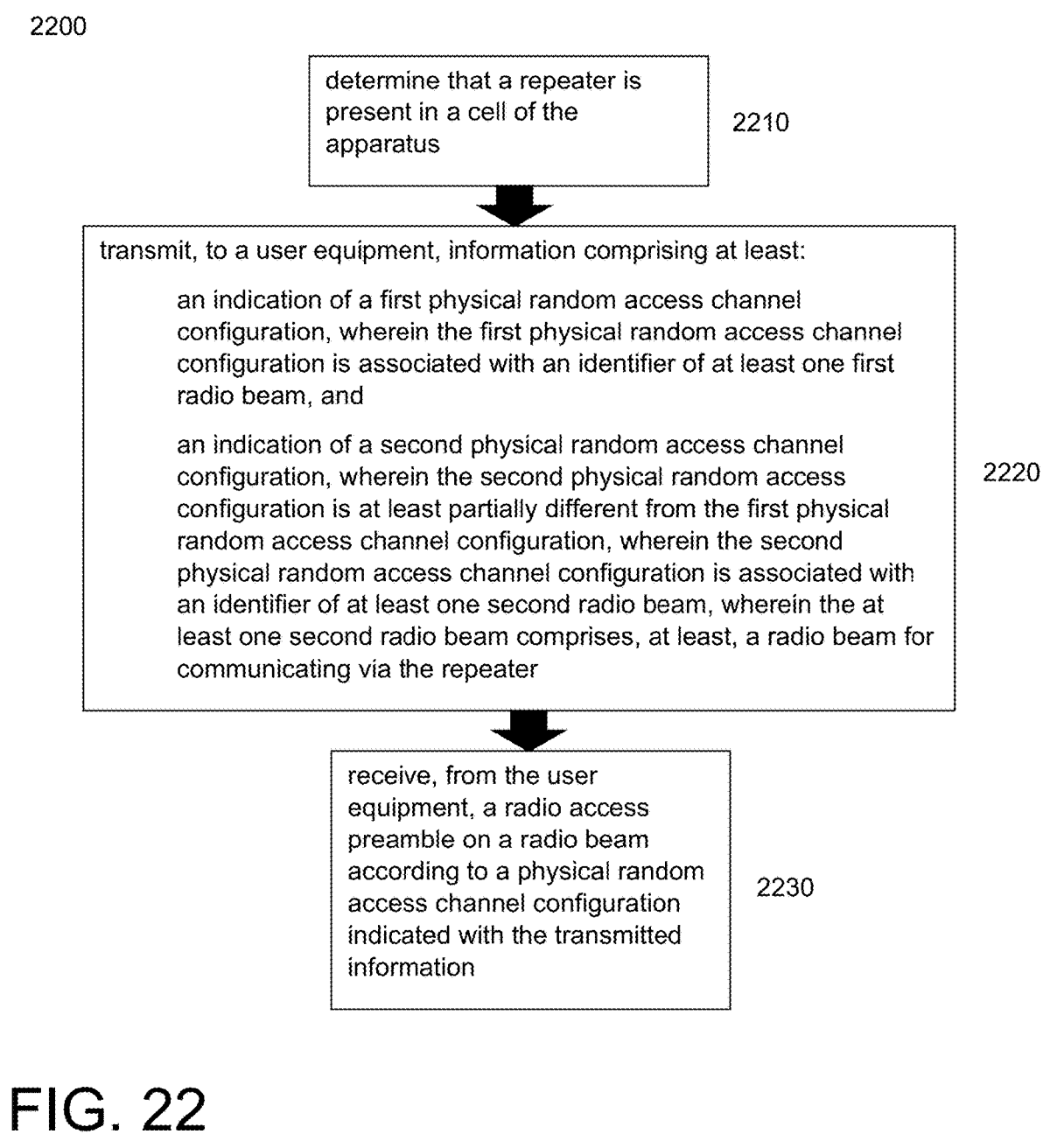

2200 determine that a repeater is
present in a cell of the
apparatus                                2210 transmit, to a user equipment, information comprising at least:

an indication of a first physical random access channel
configuration, wherein the first physical random access channel
configuration is associated with an identifier of at least one first
radio beam, and an indication of a second physical random access channel
configuration, wherein the second physical random access
configuration is at least partially different from the first physical
random access channel configuration, wherein the second
physical random access channel configuration is associated with
an identifier of at least one second radio beam, wherein the at
least one second radio beam comprises, at least, a radio beam for
communicating via the repeater                            2220 receive, from the user
equipment, a radio access
preamble on a radio beam
according to a physical random
access channel configuration          2230
indicated with the transmitted
information

FIG. 22

2300 receive, from a user equipment, a radio access preamble on a
radio beam according to a physical random access channel
configuration, wherein the physical random access channel
configuration comprises at least one of:

a first physical random access channel configuration,
    wherein the first physical random access channel
    configuration is associated with an identifier of at least one
    first radio beam, or a second physical random access channel configuration,
    wherein the second physical random access configuration
    is at least partially different from the first physical random
    access channel configuration, wherein the second physical
    random access channel configuration is associated with an
    identifier of at least one second radio beam, wherein the at
    least one second radio beam comprises a radio beam for
    communicating via the apparatus

2310

transmit the received radio
access preamble to a network
node

SSB SPECIFIC PRACH CONFIGURATION

TECHNICAL FIELD

The example and non-limiting embodiments relate generally to cell coverage and, more particularly, to PRACH detection.

BACKGROUND

It is known, in network communication, to employ repeaters to extend cell coverage.

SUMMARY

The following summary is merely intended to be illustrative. The summary is not intended to limit the scope of the claims.

In accordance with one aspect, an apparatus comprising: at least one processor; and at least one memory including computer program code; the at least one memory and the computer program code configured to, with the at least one processor, cause the apparatus at least to: receive information comprising at least: an indication of a first physical random access channel configuration, wherein the first physical random access channel configuration is associated with an identifier of at least one first radio beam, and an indication of a second physical random access channel configuration, wherein the second physical random access configuration is at least partially different from the first physical random access channel configuration, wherein the second physical random access channel configuration is associated with an identifier of at least one second radio beam, wherein the at least one second radio beam comprises, at least, a radio beam for communicating with a network node via a repeater; select a radio beam; select a physical random access channel configuration based, at least partially, on the received information; and transmit, to the network node, a radio access preamble on the selected radio beam according to the selected physical random access channel configuration.

In accordance with one aspect, a method comprising: receiving information comprising at least: an indication of a first physical random access channel configuration, wherein the first physical random access channel configuration is associated with an identifier of at least one first radio beam, and an indication of a second physical random access channel configuration, wherein the second physical random access configuration is at least partially different from the first physical random access channel configuration, wherein the second physical random access channel configuration is associated with an identifier of at least one second radio beam, wherein the at least one second radio beam comprises, at least, a radio beam for communicating with a network node via a repeater; selecting a radio beam; selecting a physical random access channel configuration based, at least partially, on the received information; and transmitting, to the network node, a radio access preamble on the selected radio beam according to the selected physical random access channel configuration.

In accordance with one aspect, an apparatus comprising means for performing: receiving information comprising at least: an indication of a first physical random access channel configuration, wherein the first physical random access channel configuration is associated with an identifier of at least one first radio beam, and an indication of a second physical random access channel configuration, wherein the second physical random access configuration is at least partially different from the first physical random access channel configuration, wherein the second physical random access channel configuration is associated with an identifier of at least one second radio beam, wherein the at least one second radio beam comprises, at least, a radio beam for communicating with a network node via a repeater; selecting a radio beam; selecting a physical random access channel configuration based, at least partially, on the received information; and transmitting, to the network node, a radio access preamble on the selected radio beam according to the selected physical random access channel configuration.

In accordance with one aspect, a non-transitory computer-readable medium comprising program instructions stored thereon which, when executed with at least one processor, cause the at least one processor to: cause receiving of information comprising at least: an indication of a first physical random access channel configuration, wherein the first physical random access channel configuration is associated with an identifier of at least one first radio beam, and an indication of a second physical random access channel configuration, wherein the second physical random access configuration is at least partially different from the first physical random access channel configuration, wherein the second physical random access channel configuration is associated with an identifier of at least one second radio beam, wherein the at least one second radio beam comprises, at least, a radio beam for communicating with a network node via a repeater; select a radio beam; select a physical random access channel configuration based, at least partially, on the received information; and cause transmitting, to the network node, of a radio access preamble on the selected radio beam according to the selected physical random access channel configuration.

In accordance with one aspect, an apparatus comprising: at least one processor; and at least one memory including computer program code; the at least one memory and the computer program code configured to, with the at least one processor, cause the apparatus at least to: determine that a repeater is present in a cell of the apparatus; transmit, to a user equipment, information comprising at least: an indication of a first physical random access channel configuration, wherein the first physical random access channel configuration is associated with an identifier of at least one first radio beam, and an indication of a second physical random access channel configuration, wherein the second physical random access configuration is at least partially different from the first physical random access channel configuration, wherein the second physical random access channel configuration is associated with an identifier of at least one second radio beam, wherein the at least one second radio beam comprises, at least, a radio beam for communicating via the repeater; and receive, from the user equipment, a radio access preamble on a radio beam according to a physical random access channel configuration indicated with the transmitted information.

In accordance with one aspect, a method comprising: determining that a repeater is present in a cell of a base station; transmitting, to a user equipment, information comprising at least: an indication of a first physical random access channel configuration, wherein the first physical random access channel configuration is associated with an identifier of at least one first radio beam, and an indication of a second physical random access channel configuration, wherein the second physical random access configuration is at least partially different from the first physical random access channel configuration, wherein the second physical random access channel configuration is associated with an identifier of at least one second radio beam, wherein the at least one second radio beam comprises, at least, a radio beam for communicating via the repeater; and receiving, from the user equipment, a radio access preamble on a radio beam according to a physical random access channel configuration indicated with the transmitted information.

In accordance with one aspect, an apparatus comprising means for performing: determining that a repeater is present in a cell of the apparatus; transmitting, to a user equipment, information comprising at least: an indication of a first physical random access channel configuration, wherein the first physical random access channel configuration is associated with an identifier of at least one first radio beam, and an indication of a second physical random access channel configuration, wherein the second physical random access configuration is at least partially different from the first physical random access channel configuration, wherein the second physical random access channel configuration is associated with an identifier of at least one second radio beam, wherein the at least one second radio beam comprises, at least, a radio beam for communicating via the repeater; and receiving, from the user equipment, a radio access preamble on a radio beam according to a physical random access channel configuration indicated with the transmitted information.

In accordance with one aspect, a non-transitory computer-readable medium comprising program instructions stored thereon which, when executed with at least one processor, cause the at least one processor to: determine that a repeater is present in a cell of a base station; cause transmitting, to a user equipment, of information comprising at least: an indication of a first physical random access channel configuration, wherein the first physical random access channel configuration is associated with an identifier of at least one first radio beam, and an indication of a second physical random access channel configuration, wherein the second physical random access configuration is at least partially different from the first physical random access channel configuration, wherein the second physical random access channel configuration is associated with an identifier of at least one second radio beam, wherein the at least one second radio beam comprises, at least, a radio beam for communicating via the repeater; and receiving, from the user equipment, a radio access preamble on a radio beam according to a physical random access channel configuration indicated with the transmitted information.

In accordance with one aspect, an apparatus comprising: at least one processor; and at least one memory including computer program code; the at least one memory and the computer program code configured to, with the at least one processor, cause the apparatus at least to: receive, from a user equipment, a radio access preamble on a radio beam according to a physical random access channel configuration, wherein the physical random access channel configuration comprises at least one of: a first physical random access channel configuration, wherein the first physical random access channel configuration is associated with an identifier of at least one first radio beam, or a second physical random access channel configuration, wherein the second physical random access configuration is at least partially different from the first physical random access channel configuration, wherein the second physical random access channel configuration is associated with an identifier of at least one second radio beam, wherein the at least one second radio beam comprises a radio beam for communicating via the apparatus; and transmit the received radio access preamble to a network node.

In accordance with one aspect, a method comprising: receiving, from a user equipment, a radio access preamble on a radio beam according to a physical random access channel configuration, wherein the physical random access channel configuration comprises at least one of: a first physical random access channel configuration, wherein the first physical random access channel configuration is associated with an identifier of at least one first radio beam, or a second physical random access channel configuration, wherein the second physical random access configuration is at least partially different from the first physical random access channel configuration, wherein the second physical random access channel configuration is associated with an identifier of at least one second radio beam, wherein the at least one second radio beam comprises a radio beam for communicating via a repeater; and transmitting the received radio access preamble to a network node.

In accordance with one aspect, an apparatus comprising means for performing: receiving, from a user equipment, a radio access preamble on a radio beam according to a physical random access channel configuration, wherein the physical random access channel configuration comprises at least one of: a first physical random access channel configuration, wherein the first physical random access channel configuration is associated with an identifier of at least one first radio beam, or a second physical random access channel configuration, wherein the second physical random access configuration is at least partially different from the first physical random access channel configuration, wherein the second physical random access channel configuration is associated with an identifier of at least one second radio beam, wherein the at least one second radio beam comprises a radio beam for communicating via the apparatus; and transmitting the received radio access preamble to a network node.

In accordance with one aspect, a non-transitory computer-readable medium comprising program instructions stored thereon which, when executed with at least one processor, cause the at least one processor to: cause receiving, from a user equipment, of a radio access preamble on a radio beam according to a physical random access channel configuration, wherein the physical random access channel configuration comprises at least one of: a first physical random access channel configuration, wherein the first physical random access channel configuration is associated with an identifier of at least one first radio beam, or a second physical random access channel configuration, wherein the second physical random access configuration is at least partially different from the first physical random access channel configuration, wherein the second physical random access channel configuration is associated with an identifier of at least one second radio beam, wherein the at least one second radio beam comprises a radio beam for communicating via a repeater; and cause transmitting of the received radio access preamble to a network node.

BRIEF DESCRIPTION OF THE DRAWINGS

The foregoing aspects and other features are explained in the following description, taken in connection with the accompanying drawings, wherein:

FIG. 4a is a diagram illustrating features as described herein;

FIG. 6 is a diagram illustrating features as described herein;

FIG. 12 is a diagram illustrating features as described herein;

FIG. 17 is a flowchart illustrating steps as described herein;

FIG. 18 is a flowchart illustrating steps as described herein;

FIG. 19 is a diagram illustrating features as described herein;

FIG. 20 is a diagram illustrating features as described herein;

FIG. 21 is a flowchart illustrating steps as described herein;

FIG. 22 is a flowchart illustrating steps as described herein; and

FIG. 23 is a flowchart illustrating steps as described herein.

DETAILED DESCRIPTION OF EMBODIMENTS

Figure 1:
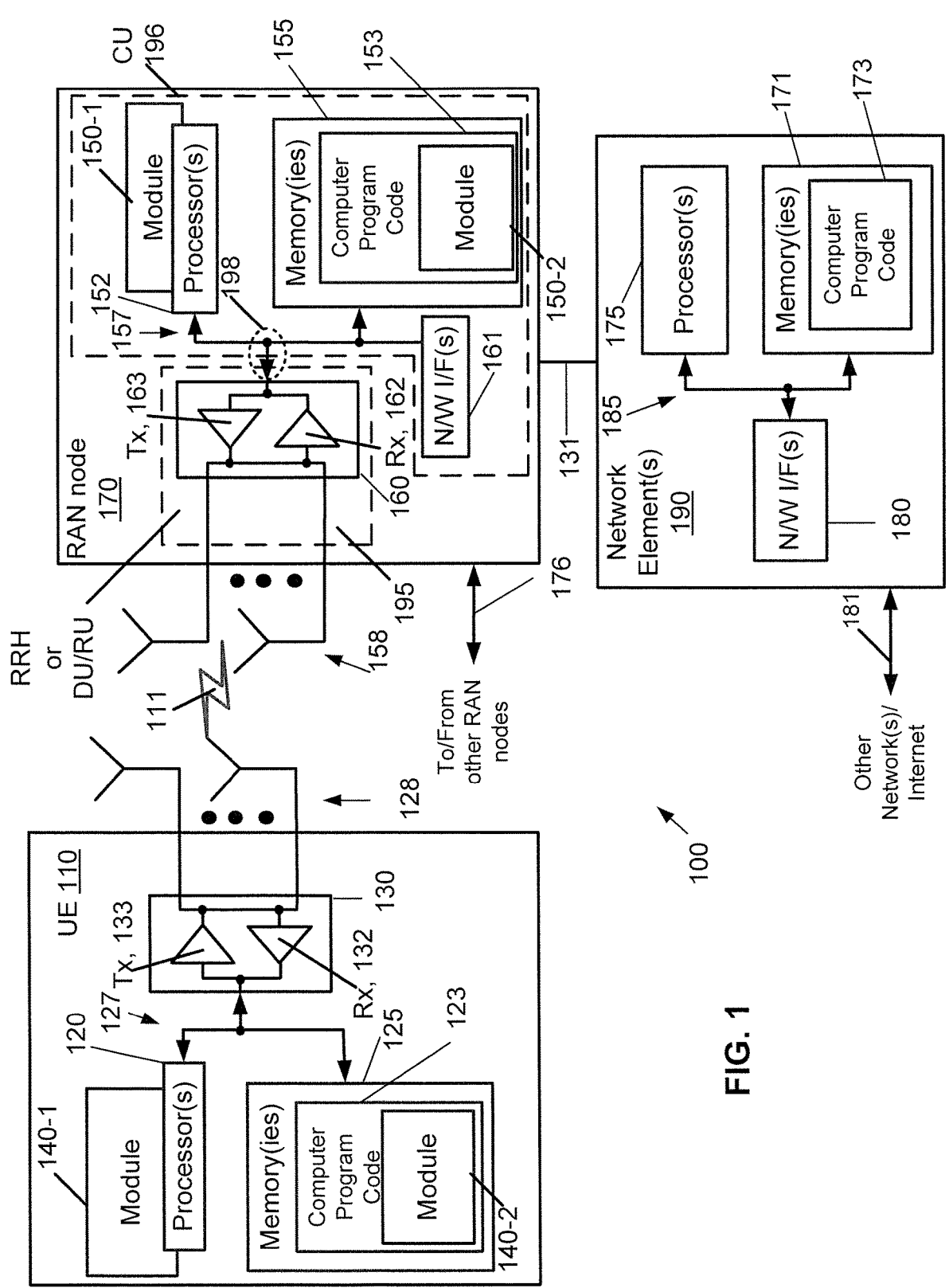
FIG. 1 is a block diagram of one possible and non-limiting example system in which the example embodiments may be practiced.

The following abbreviations that may be found in the specification and/or the drawing figures are defined as follows:

3G third generation
3GPP third generation partnership project
4G fourth generation
5G fifth generation
5GC core network
AI artificial intelligence
AMF access and mobility management function
BWP bandwidth part
CE control element
CP cyclic prefix
CS cyclic offset
CU centralized unit
DCI downlink control information
DRB data radio bearer
DU distributed unit EIRP effective isotropic radiated power
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FDM frequency division multiplexing
FFT fast Fourier transform
FR1 frequency range 1
gNB (or gNodeB) base station for 5G/NR, i.e., a node providing NR user plane and control plane protocol terminations towards the UE, and connected via the NG interface to the 5GC
GP guard period length
IAB integrated access and backhaul
IE information element
I/F interface
L1 layer 1
LRA location-report-answer
LTE long term evolution
MAC medium access control
ML machine learning
MME mobility management entity
NCR network controlled repeater
ng or NG new generation
ng-eNB or NG-eNB new generation eNB
NR new radio
NAY or NW network
OFDM orthogonal frequency division multiplexing
PDCCH physical downlink control channel
PDCP packet data convergence protocol
PHY physical layer
PRACH physical random access channel
PUSCH physical uplink shared channel
RACH random access channel
RAN radio access network
RAPID random access preamble ID
RAR random access response
RF radio frequency
RLC radio link control
RO RACH occasion
RRC radio resource control
RRH remote radio head
RS reference signal
RSRP reference signal received power
RSRQ reference signal received quality
RU radio unit
Rx receiver
SDAP service data adaptation protocol
SDM spatial division multiplexing
SFN subframe number
SGW serving gateway
SIB system information block
SMF session management function
SR smart repeater
SSB synchronization signal block
TAC timing advance command
TDOA time difference of arrival
Tseq sequence length
Tx transmitter
UE user equipment (e.g., a wireless, typically mobile device)
UPF user plane function
URLLC ultra reliable low latency connection Turning to FIG. 1, this figure shows a block diagram of one possible and non-limiting example in which the examples may be practiced. A user equipment (UE) 110, radio access network (RAN) node 170, and network element (s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNB s 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely illustrative functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the example embodiments of the present disclosure, example embodiments will now be described with greater specificity.

Features as described herein generally relate to cellular repeaters, for example network controlled repeaters (NCR). Cellular repeaters are widely used in 2G/3G/4G wireless networks to provide coverage extension. A classical radio frequency (RF) repeater may receive a signal from a nearby base station, amplify and retransmit it to the nearby user equipment in the downlink direction; and in the uplink direction, the RF repeater may receive signals from the UE equipment, amplify and retransmit it to the base station. Classical RF repeaters are not capable of changing the directivity in the uplink or downlink directivity over time, frequency, or any other dimension.

5G NR repeaters support beamforming capabilities, i.e., they use, for example, a narrow beam on the access link to communicate with the UE, and use, for example, a narrow beam (only) on the backhaul link to communicate with the base station. In 3GPP, 5G repeaters used to be referred to as "Smart" Repeaters (SR), and are now known as "Network-Controlled" Repeaters (NCR), which implies that some "intelligence" is required to dynamically manage the directivities of the beams generated by the repeater, for example according to the traffic conditions. Moreover, decisions for the repeater may be made by the Network (NW), and the repeater may be controlled via a dedicated control link [RP-213700].

5G NR repeaters are being standardized. For example, 5GNR repeaters have undergone some standardization work in RAN 4 area in 3GPP Release 17 (WI: NR Repeaters, WID: RP-210818). For example, 5G NR repeaters with a control channel to the NW are to be further standardized in the RAN 1 to RAN 4 areas in 3GPP Release 18, with the first TUs requested for RAN 1 #109 (SI: FS_NR_NetConRepeater, RP-213700). For example, TS 38.106 is dedicated to the NR (RF) repeater specification, which is an extension of TS 36.106 (LTE Repeater). It might serve as the place to specify NetConRepeaters, or a new spec might be created.

For repeaters, a physical random access (PRACH) preamble configuration, and selection criteria, may be based on cell range. In comparison with LTE, 5G NR supports a number of additional PRACH preamble formats, with the goal of providing a finer granularity fit to different cell sizes under different subcarrier spacing configurations, for example long and short preamble formats.

PRACH configuration parameters that may be impacted by the cell range may comprise, (1) from the time domain signature perspective, PRACH preamble format and the associated PRACH occasion; and, (2) from the PRACH preamble data sequence perspective, cyclic shift offset $N_{CS}$ on root sequence.

Figure 2:
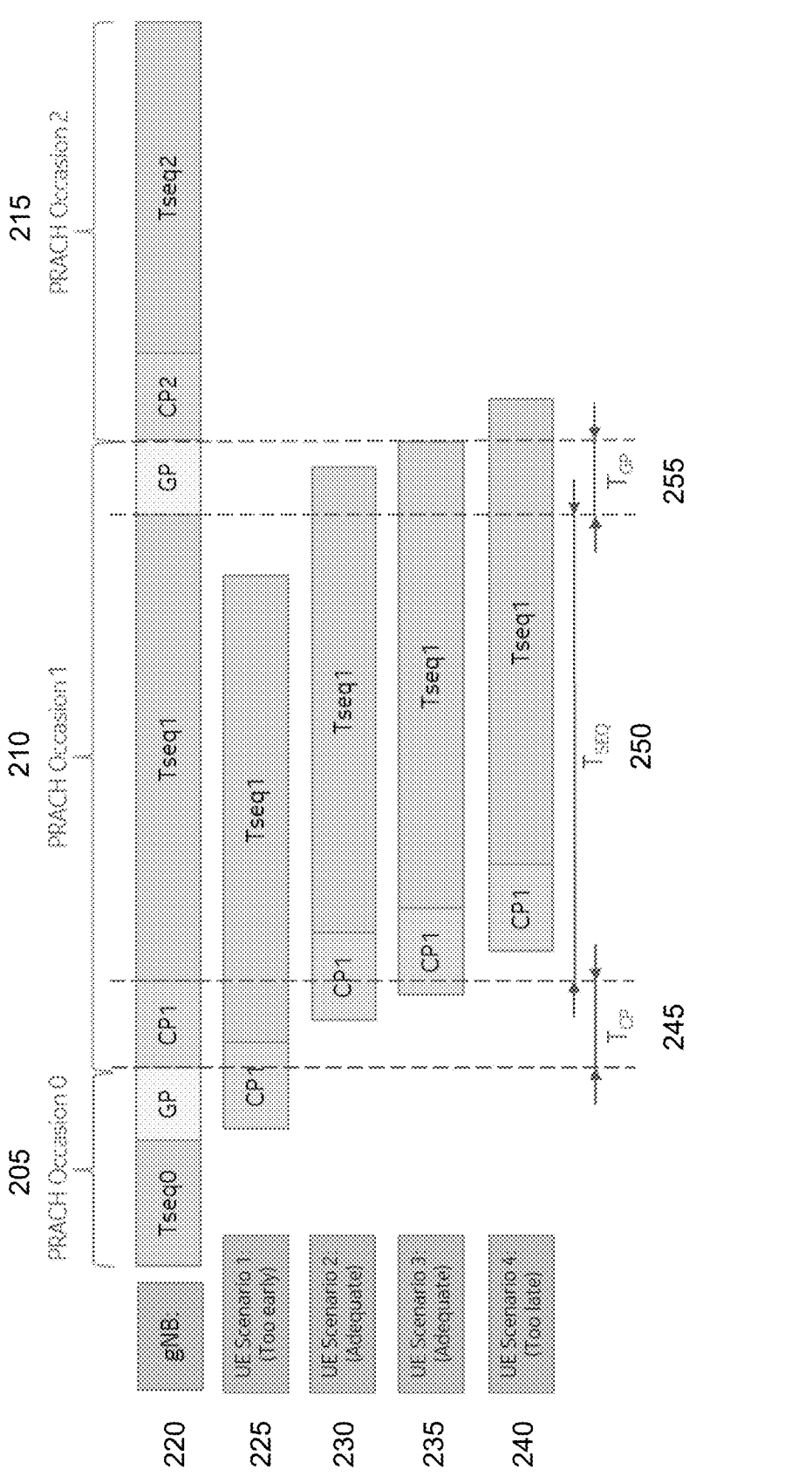
FIG. 2 is a diagram illustrating features as described herein.

A PRACH occasion, in the time domain, may include the Cyclic Prefix (CP), the Sequence Length (Tseq) and the Guard Period Length (GP). A PRACH preamble may include the CP and Tseq. FIG. 2 shows four potential scenarios in which the UE may transmit the PRACH preamble into PRACH Occasion 1 (210), to be detected by the gNB.

Referring now to FIG. 2, illustrated is an example of time domain signature selection based on cell range. Illustrated are PRACH occasion 0 (205), PRACH occasion 1 (210), and PRACH occasion 2 (215). It should be noted that PRACH occasion 0 (205) and PRACH occasion 2 (215) are only partially illustrated; if fully drawn, PRACH occasion 0 (205) and PRACH occasion 2 (215) may have durations equal to that of PRACH occasion 1 (210). In the non-limiting example of FIG. 2, the gNB (220) may be configured to detect CP0, Tseq0 and GP during PRACH Occasion 0 (205); CP1, Tseq1, and GP during PRACH Occasion 1 (210); and CP2, Tseq2, and GP during PRACH Occasion 2 (215).

In UE scenario 1 (225), a UE may transmit a CP1 partially during PRACH Occasion 0 (205) and partially during PRACH Occasion 1 (210), and may transmit a Tseq1 during PRACH Occasion 1 (210). Accordingly, the transmission in UE scenario 1 (225) may be too early for proper/successful preamble detection by gNB (220).

In UE scenario 2 (230), a UE may transmit a CP1 and a Tseq1 during PRACH Occasion 1 (210). It may be noted that CP1 at least partially overlaps with $T_{CP}$ (245), and Tseq1 at least partially overlaps with $T_{SEQ}$ (250) and $T_{CP}$ (255). Accordingly, the transmission in UE scenario 2 (230) may be properly detected by gNB (220).

In UE scenario 3 (235), a UE may transmit a CP1 and a Tseq1 during PRACH Occasion 1 (210). It may be noted that CP1 at least partially overlaps with $T_{CP}$ (245), and Tseq1 at least partially overlaps with $T_{SEQ}$ (250) and $T_{CP}$ (255). Accordingly, the transmission in UE scenario 3 (235) may be properly detected by gNB (220).

In UE scenario 4 (240), a UE may transmit a CP1 during PRACH Occasion 1 (210), and may transmit a Tseq1 partially during PRACH Occasion 1 (210) and partially during PRACH Occasion 2 (215). It may be noted that CP1 does not overlap with $T_{CP}$ (245). Accordingly, the transmission in UE scenario 4 (240) may be too late for proper preamble detection by gNB (220).

From FIG. 2, it may be observed that if the body of a PRACH preamble transmitted by the UE arrives in the time period that encompasses the Tseq duration (250) according to the gNB (e.g., in scenario 2 (230) or scenario 3 (235)), the gNB PRACH detector may capture a full preamble sequence (including cyclic prefix) for proper preamble detection. Otherwise, as shown in scenarios 1 (225) or 4 (240), a part of the capture by the gNB may include only noise and/or interference, which may result in a degraded detection performance. In worst-case scenarios, the PRACH transmission may interfere with other random access channel (RACH) occasions or even other UL physical channels.

The CP length $T_{CP}$ of a preamble (e.g. 245) may be chosen according to the cell radius, for example to accommodate the roundtrip time (i.e. propagation of reference signal and then the preamble submission itself):

Cell Size<=$(T_{CP}$–DelaySpread$)*C/2$

Where C: Speed of light; Maximum Delay spread: 91 or 144*κ*2^(−μ)*Tc, κ=64 and Tc=0.509 ns, which may be the length of the UL data CP.

Similarly, the guard period $T_{GP}$ (e.g. 255) at the end of the PRACH sequence may also limit the max round trip delay of the cell (and thus the cell size). However, with the exception of format C0, the gap may always be larger than 2 OFDM symbols. Ultimately, the same formula may apply:

Cell Size<=$(T_{GP})*C/2$

Where C is the Speed of light.

In summary, the criteria to select a PRACH preamble for a cell range may be that the $T_{CP}$ and $T_{GP}$ are selected such that the maximum cell range is less than min(TCP−$\tau_{ds}$, $T_{GP}$)*C/2, where C is the speed of light or 3.0×108 m/s, where $\tau_{ds}$ is the delay spread. Clearly, the cyclic prefix duration ($T_{CP}$) may be larger than the expected delay spread.

Turning now to cyclic shift offset $N_{CS}$, a gNB cell may support a maximum of 64 preamble sequences, which may be derived/determined from one or more root sequences. Each root sequence may have a fixed length (i.e., one of $L_{RA}$=839, 139, 1151, 571, depending on subcarrier spacing). Root sequences may be used cyclically to generate a number of preamble sequences. The cyclic shift offset, $N_{CS}$, may determine how many preamble sequences can be generated out of a given root sequence. The larger the $N_{CS}$, the fewer the number of preamble sequences can be generated from a given root sequence. After a given root sequence is fully utilized, a new root sequence may be generated, according to a new root sequence index, and new preamble sequences may be cyclically generated out of the new root sequence. This process may be repeated until, for example, all 64 preamble sequences are generated.

Figure 3:
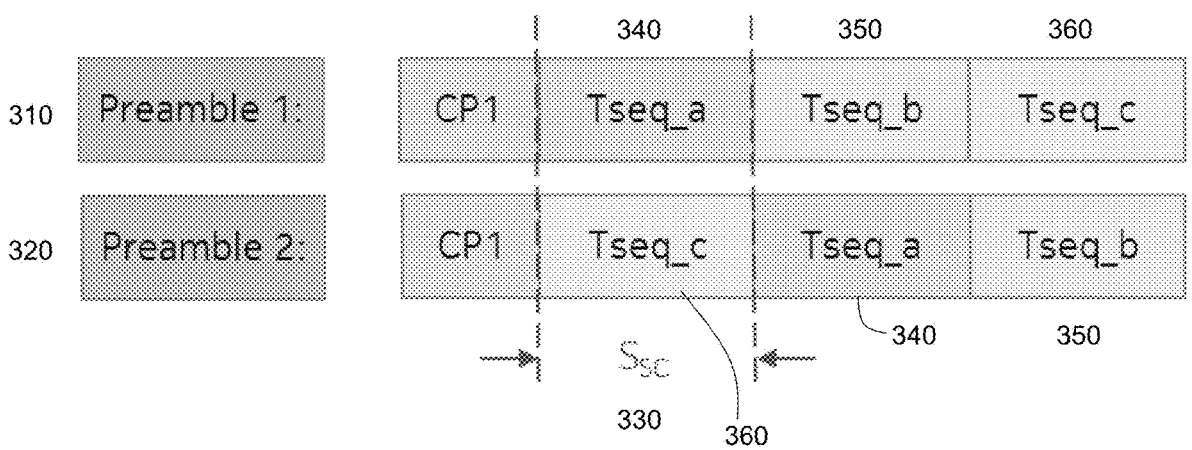
FIG. 3 is a diagram illustrating features as described herein.

Referring now to FIG. 3, illustrated is an example of cyclic shift offset in preamble sequences. FIG. 3 illustrates a simplified view of a preamble sequence Tseq that is composed of 3 segments, namely Tseq_a, Tseq_b and Tseq_c. Preamble 1 (310) may use Tseq as is, whereas Preamble 2 (320) may use a cyclic shifted version of Tseq, i.e., the Preamble 2 (320) may be Preamble 1 (310) shifted by $S_{SC}$ samples (330). Clearly, in order for the gNB PRACH detector to work correctly, these 2 preamble sequences need to be viewed as two unique sequences. To ensure that, the time duration of the cyclic shift samples ($S_{SC}$) must be larger than the maximum roundtrip time of the cell. This way, the Tseq_a segment (340) of Preamble 1 (310) and Tseq_a segment (340) of Preamble 2 (320) never overlap in the time domain when received by the gNB; in other words, there may be no correlation between Preamble 1 (310) and Preamble 2 (320). Hence, we may choose a $N_{CS}$ value large enough such that the distance between two valid cyclic shifts is larger than the maximum (i.e. round trip) propagation delay. Root sequences are an expensive resource, so we may want to create as many valid preambles from each as is technically allowable (i.e. have as small a $N_{CS}$ value as convenient).

In practice, some additional (minor) factors may need to be considered when determining the $N_{CS}$. The existing literature has an equation of calculating the optimal cyclic shift offset $N_{CS}$ as:

$$N_{cs} \geq \left( \frac{2r}{3*10^8} + \tau_{ds} \right) \frac{N_{zc}}{T_{seq}} + n_g \qquad \text{Eq. 1}$$

where $\tau_{ds}$ is the delay spread; $n_g$ is the group delay of the pulse shaping filter; $N_{zc}$ is the length of the preamble sequence, equivalent to $L_{RA}$; $T_{seq}$ is the length of the preamble sequence after FFT spread;

$$\frac{N_{zc}}{T_{seq}}$$

is the FFT transform ratio; and r is the cell range. In summary, the criteria to select the preamble data sequences may include selecting a root sequence length $L_{RA}$ and a cyclic shift offset $N_{CS}$ that satisfies Eq. 1, where r is the cell range.

When generating 64 PRACH preambles, the preamble sequences from the same root sequence may be orthogonal. For example, if $N_{CS}$=13 and root sequence length is 839, then all 64 preambles (64×13=832<839) can come from the same root sequence and are orthogonal to each other, which provides the best detection performance. The preamble sequences from different root sequences may not necessarily be (i.e., quasi) orthogonal. The larger the $N_{CS}$, the greater the number of root sequences that may be needed. Given the same $N_{CS}$, longer root sequence length $L_{RA}$ may generate more preamble sequences. From a performance perspective, it may be better to use a lower number of root sequences (i.e., smaller $N_{CS}$ or cyclic shift size), as long as the cyclic shift size is larger than what is needed for the cell range.

To ensure optimal PRACH detection performance, it may be beneficial to select the PRACH configuration (i.e. PRACH preamble format and $N_{CS}$ configuration) that is commensurate with the cell range. If the PRACH configuration is too small for the cell range, PRACH detection performance may be degraded due to inter symbol interference (e.g. insufficient Guard Period) and/or ambiguity (e.g. $N_{CS}$ too short). If the PRACH configuration is too big for the cell range, more root sequences will be needed, which may degrade the orthogonality between the 64 preamble sequences (e.g. higher probability of false detection). Additionally, the time-frequency resources and root sequence resources for PRACH may be wasted. In 3GPP TS 38.211, the zeroCorrelationZoneConfig parameter is used to enumerate the different $N_{CS}$ values under various configurations.

As mentioned above, a RACH occasion (RO) is a resource specified in the time and frequency domains that may be available for the transmission of a PRACH preamble. In 3GPP NR, synchronization signal block (SSB) indices are associated to ROs via higher-layer signaling. Mapping flexibility may be quite large, in order to accommodate different network deployments and loads. According to TR 38.213 section 8.1, the mapping between SSB and RO is defined mainly by 2 parameters: (1) Ssb-perRACH-OccasionAndCB-PreamblePerSSB specifies the number of SSB s mapped to one RO and the number of preamble indices associated with a single SSB; and (2) msg1-FDM specifies the number of ROs in frequency domain.

Regardless of how the mapping is configured, upon reception of the cell-specific PRACH configuration, each UE knows which preambles can be chosen for transmission in which RO, when the selection of an SSB beam has been performed. The gNB may then perform preamble reception and detection with no ambiguity.

In an example random access procedure, a UE may transmit PRACH signaling, comprising Msg1 and a PRACH preamble, to a base station. The PRACH signaling may comprise a Zadoff-Chu sequence. The base station may transmit PDSCH to the UE. The PDSCH may comprise Msg2, RAR (RA-RNTI), temporary C-RNTI, UL grant, TA, etc. After a time period, the UE may transmit physical uplink shared channel (PUSCH) signaling to the base station. The PUSCH may comprise Tx1, Msg3, temp-CRNTI, C-RNTI, etc. The base station may verify/decode the PUSCH successfully. In other words, the base station may perform preamble reception and detection with no ambiguity. The UE may run a MAC Contention Resolution timer during this time. The base station may transmit, to the UE, Msg4, which may comprise RC setup.

Figure 4A:
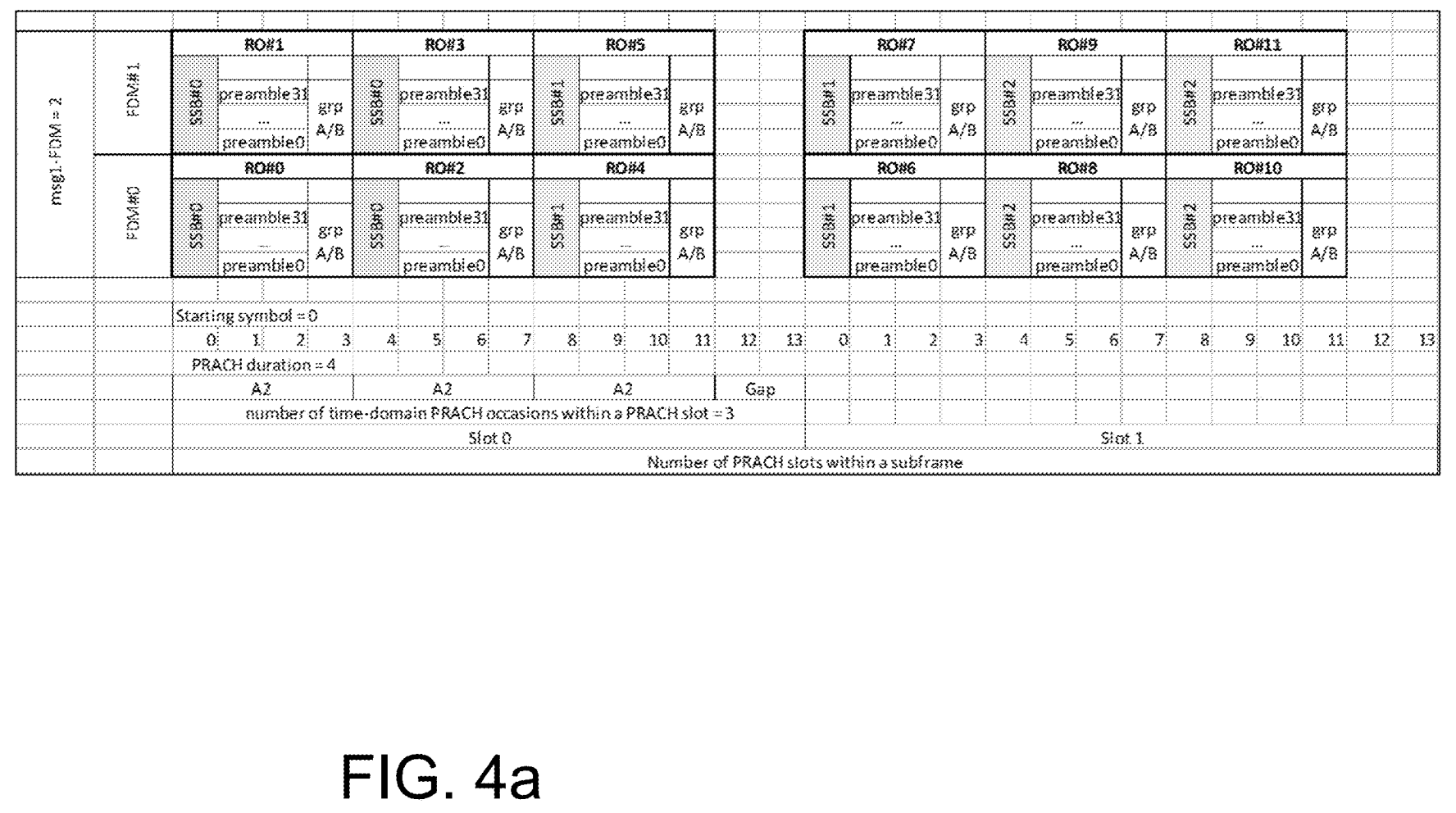
Figure 4B:
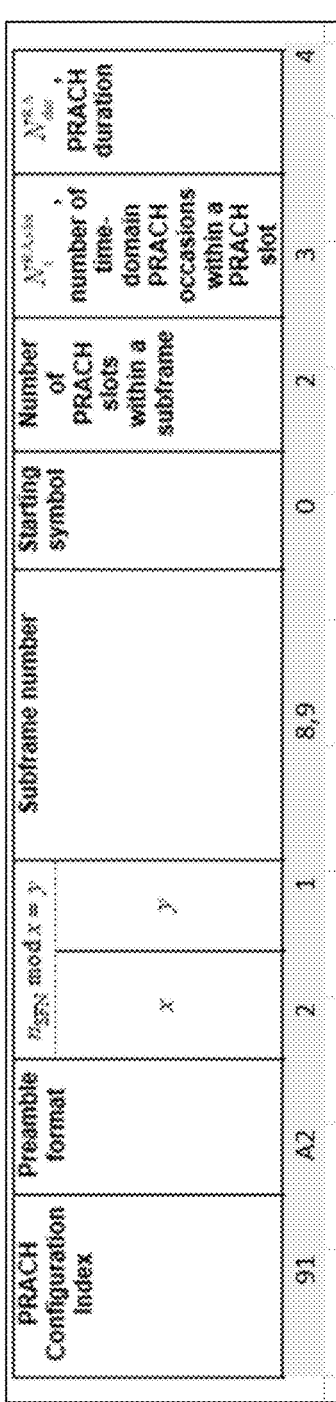
FIG. 4b is a diagram illustrating features as described herein.

An example of SSB to RO association is given in FIGS. 4a and 4b, which represent the case of PRACH configuration index 91 (as per Table 6.3.3.2-3 of 3GPP TS 38.211) with msg1-FDM=2 and ssb-perRACH-OccasionAndCB-PreamblesPerSSB=oneFourth/n32. FIG. 4b illustrates PRACH configurations for FR1 and unpaired spectrum. In FIGS. 4a and 4b, many details have been omitted for illustrative purposes, but it may be observed how the chosen RO may map to an SSB beam and preambles. For example, in the illustrated example, RO #1 maps to SSB #0 and preamble format A2.

Figure 5:
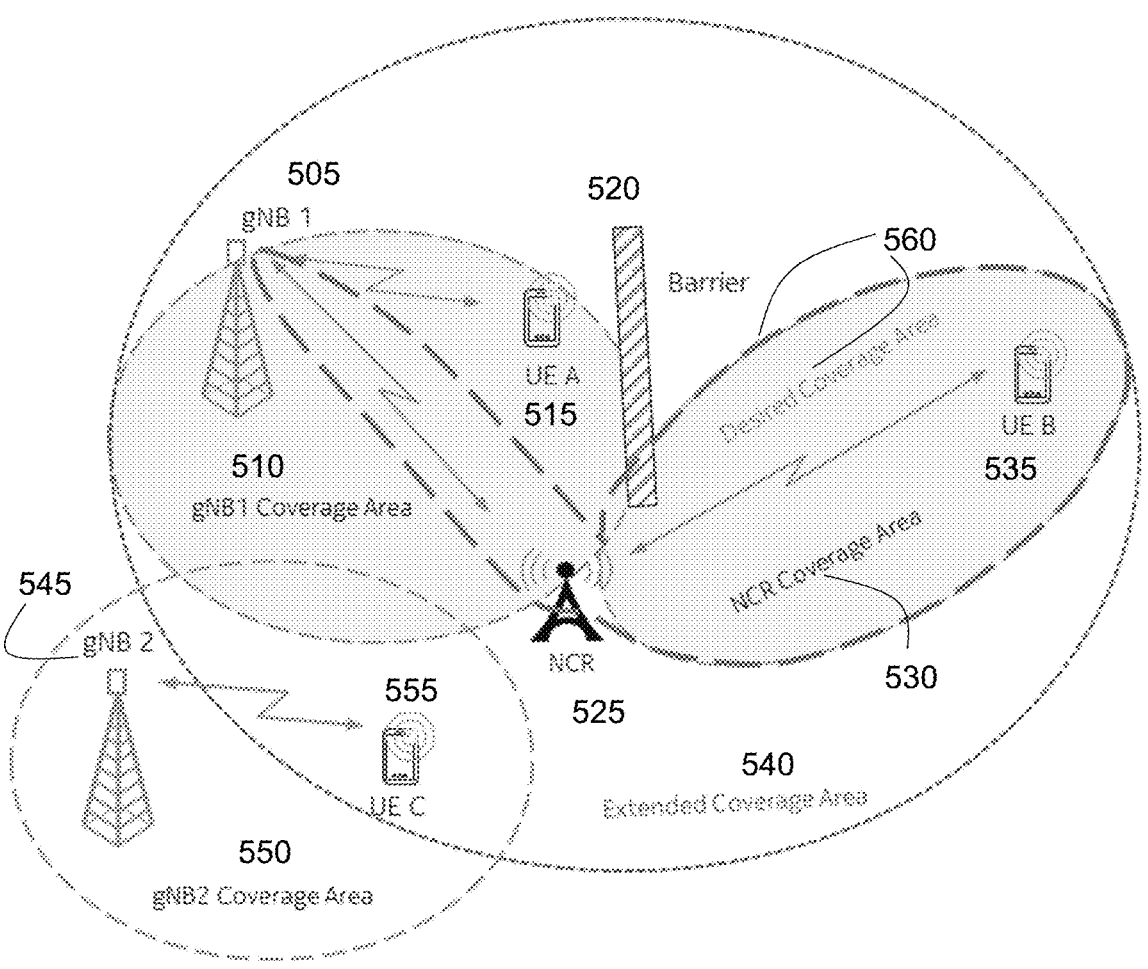
FIG. 5 is a diagram illustrating features as described herein.

Referring now to FIG. 5, illustrated is an example of cell range extension through a network controlled repeater. Network Controlled Repeaters (NCR) are currently being studied in Rel-18 NR as a solution used to fill coverage holes and extend the cell coverage. An NCR may be understood as an amplify and forward device with configurable (e.g. semi-static and dynamic) link direction, multi-beam support, ON/OFF, and gain control. For example, an NCR may be deployed in the topology to get around a barrier, as shown in FIG. 5 (i.e. 520). Example embodiments of the present disclosure may apply to NCR as well as to Rel-17 (i.e., "dumb") repeaters, and repeaters in general. As long as there are long distance UEs that are constrained to certain SSBs from the gNB point of view, the example embodiments may apply, at least in principle.

FIG. 5 illustrates a non-limiting example of a network including, at least, gNB1 (505), gNB2 (545), an NCR (525), UE A (515), UE B (535), and UE C (555). The gNB1 (505) serves UE A (515) in gNB1 coverage area (510). The NCR (525) is located in the gNB1 coverage area (510) and it may amplify-forward the gNB1 (505) beams that are directed towards the NCR (525) into the NCR Coverage Area (530). UE B (535) is served by the gNB1 (505) via the NCR (525). gNB2 (545) serves UE C (555), and is a neighbor of gNB1 (505).

As shown in FIG. 5, with the NCR (525), the gNB1 coverage area (510) is now extended to include the NCR coverage area (530) as well. Compared with UE A (515), UE B (535) requires a longer time delay to communicate with gNB1 (505), due to the much longer propagation path and the internal delay of the NCR (525). If the PRACH configuration was originally optimized for UEs in the gNB1 coverage area (510) (e.g., UE A (515)), the PRACH configuration may no longer be adequate for UE B (535) due to the significantly larger round trip propagation delay that, as previously mentioned, is a critical parameter of optimal PRACH configuration.

Alternatively, the PRACH configuration of gNB1 (505) may be configured for the worst-case scenario that encompasses both gNB1 coverage area (510) and the NCR coverage area (530) (shown as the Extended coverage area (540) in encompassing dashed circle). 3GPP specification may currently allow for a PRACH configuration for covering a bigger cell range uniformly in all radio beam directions (i.e. an extended coverage area such as 540).

Example embodiments of the present disclosure may involve a gNB providing multiple PRACH configurations per radio beam; PRACH configurations associated with different radio beams may have different cyclic shift offset ($N_{CS}$) value and/or preamble format.

According to the current art, the PRACH configuration may be cell specific (i.e., PRACH configuration may be received as an RRC IE in SIB1>rach-ConfigCommon>rach-ConfigGeneric) and may be applicable to all spatial directions across the extended coverage area of gNB1 (e.g. 540). However, as can be observed in FIG. 5, in an example embodiment, the range extension introduced by the NCR may only happen in the spatial direction that goes from gNB1 to the NCR. In all other spatial directions, there may be no range extensions. In an example embodiment, a longer range PRACH configuration may be narrower than a PRACH configuration that extends uniformly in all radio beam directions (e.g. 560). In an example embodiment, the coverage area that actually requires a longer PRACH preamble or a larger $N_{CS}$ may be quite small (e.g. desired coverage area (560), thick dashed line encompassing beam from gNB1 (550) and NCR coverage area (530)).

Using a longer PRACH preamble format and a larger $N_{CS}$ uniformly across all spatial directions may be suboptimal. More specifically, it may degrade the PRACH performance in the spatial directions that do not communicate via the NCR. A larger cell range may need a bigger cyclic shift value, which may increase the total number of required root sequences in gNB1. Since the root sequences are not necessarily orthogonal, the preamble sequences that are generated out of these root sequences are not necessarily orthogonal either, which may make the PRACH detection performance worse. Note that only a subset of spatial directions (e.g. directions associated with the repeater) requires the bigger cyclic shift value. Other spatial directions may be unfairly penalized, as this cyclic shift value is cell-specific rather than direction specific. The whole network shares the same pool of root sequences; thus, using more root sequences per cell may increase the re-use factor and, consequently, increase interference and/or collisions, which may result in degraded detection performance not only in the serving cell, but in neighboring cells as well.

Using a PRACH preamble format with a longer time duration may require more time-frequency resources (i.e., more symbols are needed for the corresponding PRACH Occasion), which may lead to suboptimal usage of time-frequency resources. Each RACH occasion (RO) may be bigger. Since the RO is uniformly used for all SSB beams, the total number of symbols needed for the bigger ROs may be higher than for the previous, shorter ROs. As a result, more PRACH slots may be needed from the pool of time-frequency resources, which otherwise could have been allocated to transmit user traffic, such as PUSCH.

Having more root sequences in, for example, gNB1 coverage may "pollute" a neighboring cell. As shown in FIG. 5, since the extended coverage area (540) of gNB1 (505) now largely overlaps the gNB2 coverage area (550), it increases the chance that the preamble sequences used in gNB1 (505) will be falsely detected by gNB2 (545) as a PRACH preamble signal from UE C (555). This may result in a waste of root sequences resources in cell planning for surrounding cells. As the gNB 1 cell range increases, the required number of root sequences increases; this may reduce the pool of root sequences available for the neighboring cells, causing issues in RACH network planning.

The above problems provide an opportunity for improvement on the RACH operation. A technical effect of example embodiments of the present disclosure may be to support the extended cell range in the spatial direction of the NCR without sacrificing the PRACH detection performance in other spatial directions that do not have the NCR.

The other potential use cases for an irregular shaped coverage area where example embodiments of the present disclosure, such as spatial direction-dependent PRACH, may cause benefit may include: the SSB beam specific EIRP reduction due to regulatory restrictions, EIRP in some spatial directions must be lower than some other spatial directions; and/or a non-uniform coverage shape due to terrain, such as an urban street canyon.

In 3GPP TS 38.211 and 38.213, PRACH configuration is cell-specific. The PRACH Configuration index determines the PRACH preamble format, PRACH occasion, and the PRACH slot offsets in the subframe. The zeroCorrelation- ZoneConfig parameter determines the $N_{CS}$ value. The same PRACH configuration and zeroCorrelationZoneConfig are applied to all SSBs.

Example embodiments of the present disclosure propose that the PRACH configuration may be SSB-specific. SSB beams from a donor gNB may point/travel to different spatial directions, in which a subset of the SSB beams may be dedicated to the NCR. A donor gNB may be a gNB with cell coverage that does not reach a given UE without support of an NCR. In other words, without NCR support, the donor gNB would not be able to communicate with the UE. In an example embodiment, a different PRACH configuration may be used for SSB beams that are dedicated to the NCR to support extended cell range. Each SSB beam may use the most optimal PRACH configuration, for example the PRACH configuration that matches the cell range in one or more spatial directions.

Currently, SSB beam are mapped with the PRACH occasions; when there are multiple SSB beams, the PRACH occasions may be associated with ROs at different time/frequency locations such that the gNB can tell which direction the UE comes from. This is included in the 3GPP spec as "ssb-perRACH-OccasionAndCB-PreamblesPerSSB", as illustrated in FIG. 6. "ssb-perRACH-OccasionAndCB-PreamblesPerSSB" defines the relationship between the SSB and RACH occasions (i.e., "PerSSB") and is "configurable" (i.e., has many choices). "SSB specific," in the context of 3GPP specification(s), may mean to have multiple ROs associate with multiple beams. A UE may be configured with multiple PRACH configurations. There may be multiple PRACH configurations in a cell.

Example embodiments of the present disclosure may involve changing the signature of the PRACH signal (e.g. preamble format and sequences) on a per SSB basis, for example for selective cell coverage range extension purposes.

Example embodiments of the present disclosure may make rach-ConfigGeneric beam-specific. Example embodiments of the present disclosure may include methods of changing/details of how to change the PRACH configurations per SSB to meet the specific range requirements per SSB.

Example embodiments of the present disclosure may introduce SSB beam-specific "beam specific RACH-ConfigCommon", that is, beam specific PRACH configuration. Some example embodiments may deal with providing more than one PRACH configuration for a SSB beam. A UE may then select which one of the PRACH configurations to use based on different criteria.

A technical effect of example embodiments of the present disclosure may be to enhance the access procedure in the interworking of SSB s and the associated PRACH configurations. In an example embodiment, a first SSB may be associated with a different PRACH configuration from a second SSB. In another example embodiment, a first SSB may be associated with more than one PRACH configuration (i.e. two or more PRACH configurations), and the UE may determine which configuration to use. A technical effect of example embodiments of the present disclosure may be to provide greater assistance to a subset of UEs that require larger timing advance, in particular to those UEs served by an NCR.

In an example embodiment, for long-range beams (i.e., serving UEs via the NCR), the "zeroCorrelationZoneConfig" parameter in RACH-ConfigGeneric IE (Information Element) may be changed to a higher value to match the extended range requirements.

In other example embodiments, for the long-range beams (i.e., serving UEs via the NCR, which may have a longer round trip delay than UEs not served via NCR), the PRACH format may be changed to one with longer time duration (e.g. with respect to the Preamble format, and/or the number of time domain PRACH occasions within a PRACH slot, and/or the PRACH duration, all part of the "prach-Configurationlndex" parameter in RACH-ConfigGeneric IE) to match the extended range requirements.

Figure 7:
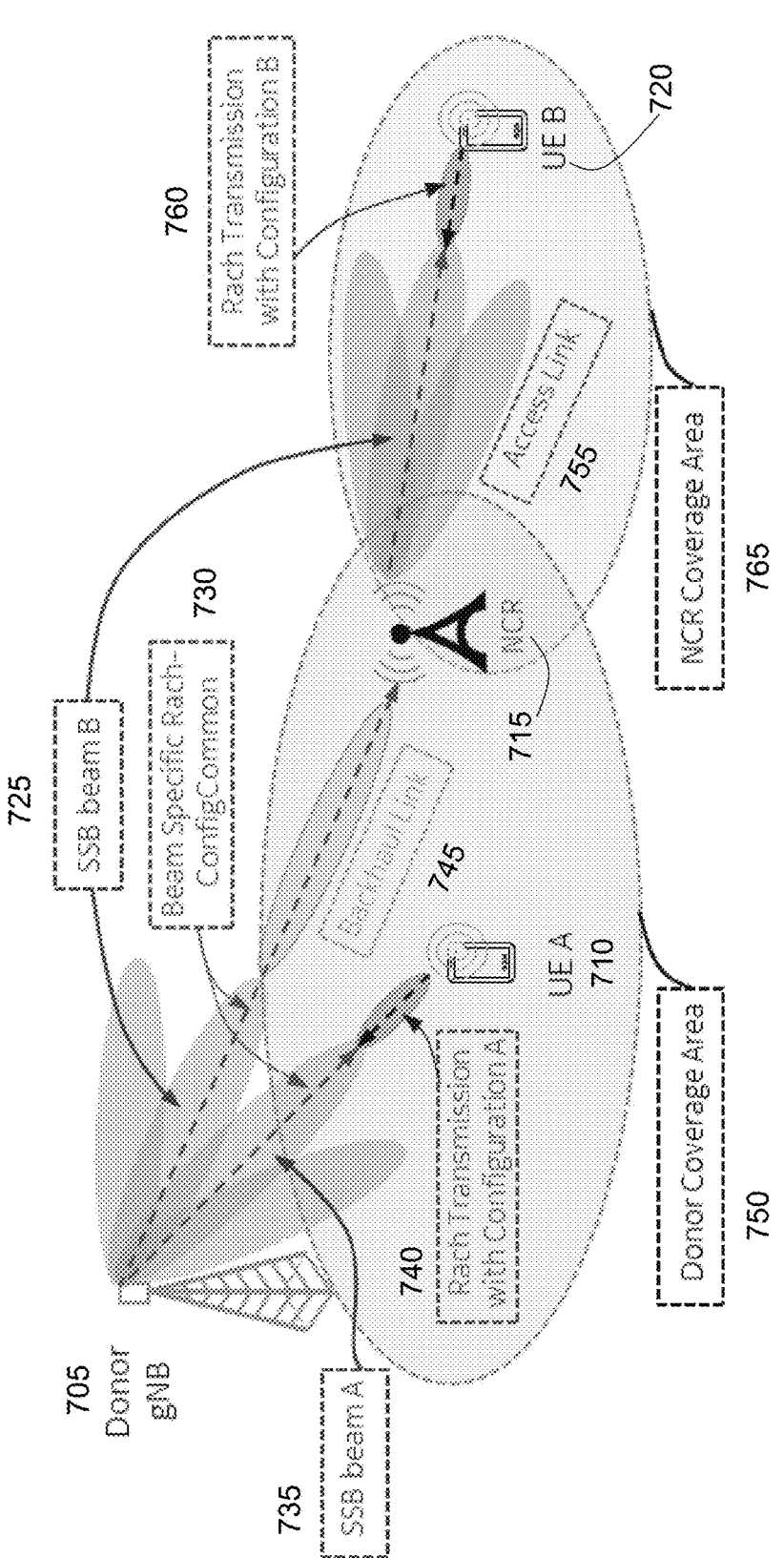
FIG. 7 is a diagram illustrating features as described herein.

Referring now to FIG. 7, illustrated is an exemplary network with a donor gNB (705), an NCR (715), and two UEs (710, 720), which may give an example of SSB-specific PRACH configuration, according to example embodiments of the present disclosure.

As shown in the non-limiting example of FIG. 7, the NCR (715) may be located in the coverage area of the donor gNB (750). The donor gNB (705) may have a number of SSB beams pointing to different spatial directions, out of which a subset of the SSB beams may be dedicated to the NCR and point in the direction of the NCR (e.g. SSB beam B (725)). The NCR (715) may receive these dedicated SSB beams through the backhaul link (745) and amplify-forward them in a new set of spatial directions in the access link (755) in the NCR coverage area (765). One of the dedicated SSB beams is shown as SSB beam B (725). UE A (710) may be located in the donor gNB coverage area (750) and may communicate with the donor gNB (705) directly (i.e. via SSB beam A (735), via PRACH transmission with Configuration A (740)). UE B (720) may be located in the NCR coverage area (765) and may communicate with the donor gNB (705) through the NCR (715). From the uplink perspective, UE B (720), which is served by the dedicated SSB beam B (725) via the NCR (715), may require a much larger timing advance than UE A (710) due to the additional propagation delay in the access link (755) and the internal group delay in the NCR (715).

In an example embodiment, the PRACH configuration may be made unique on a per-associated SSB index basis, or an NCR-specific PRACH configuration may be configured on a per-cell basis. As shown in FIG. 7, the donor gNB (705) may send a system information block (SIB) message, e.g. SIB1, that contains information that maps different PRACH configurations to different SSB beam IDs. After the UE detects the strongest SSB beam and receives the SIB message, it may use the PRACH configuration information in the SIB message according to the detected beam ID for the subsequent PRACH transmission. The PRACH configuration may be chosen to be commensurate with the cell range in the spatial direction of the corresponding SSB beam(s). As shown in FIG. 7, UE A (710) may detect SSB beam A (735) as the strongest SSB beam, and may decide to use PRACH configuration A (740) when it transmits the PRACH signal (e.g. PRACH preamble), whereas UE B (720) may detect the extended SSB beam B (725) via the NCR (715) as the strongest SSB beam, and may decide to use PRACH configuration B (760) when it transmits the PRACH signal (e.g. PRACH preamble).

Providing more than one PRACH configuration for a SSB beam may have the technical effect of enabling the same SSB beam to be repeated and still enabling the UE(s) to utilize that SSB beam 1) in the donor cell and 2) in the coverage area of the repeater. Utilization of the SSB beam in the donor cell may require a first PRACH configuration (e.g. legacy PRACH configuration); utilization of the SSB beam in the area of the repeater may require a second PRACH configuration (i.e. a configuration that allows for a longer range). With reference to FIG. 7, using two PRACH configurations for SSB beam B (725) may provide the technical effect of enabling of both UE A (710) and UE B (720) to utilize said beam B (725), and still provide efficient PRACH configuration.

Figure 8:
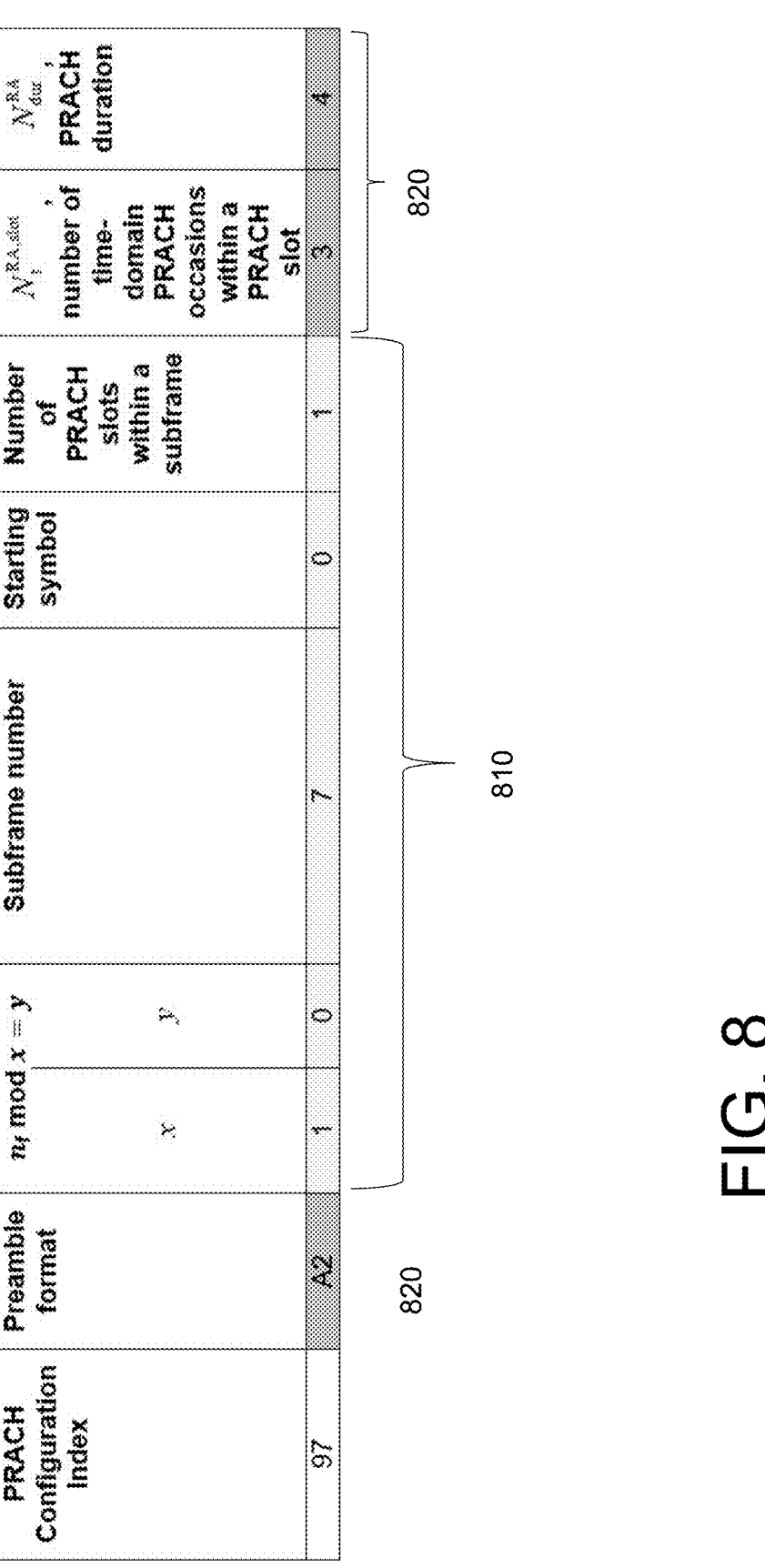
FIG. 8 is a diagram illustrating features as described herein.

In an example FR1 cell configuration for unpaired spectrum channel access, there may be a total of 4 SSB beams; the mapping between SSB beam to PRACH Occasion may be 1:1; the root sequence length may be LRA=571, and the zeroCorrelationZoneConfig may be 3; and the cell may use PRACHConfigurationIndex of 97, as shown in FIG. 8. PRACH configuration index 97 may contain two pieces of information, 810 and 820. The fields included in 810 (i.e., "nf mod x=y", subframe number, starting symbol, and number of PRACH slots within a subframe) may indicate the time domain offset of the PRACH slots, where PRACH preambles may be transmitted. In this example, the PRACH slot may be designated as slot 15 in every 10 ms subframe. The fields included in 820 may indicate the preamble format and how are they allocated into each the PRACH slots. In this example, the preamble format may be A2, which occupies 4 symbols in a PRACH Occasion. Each PRACH slot may contain 3 PRACH occasions for preamble format A2 transmissions.

Figure 9:
FIG. 9 is a diagram illustrating features as described herein.

Referring now to FIG. 9, illustrated is an example of time domain slot assignment of SSB slots and PRACH slots for the duration of two subframes (910, 920), where the SSB burst in which SSB beams (denoted as SSB #0, SSB #1, SSB #2, and SSB #3, respectively) are transmitted has a periodicity of 20 ms or two subframes. In this example, SSB #0 and SSB #1 use subframe 0 slot 0 (930), and SSB #2 and SSB #3 use subframe 0 slot1 (940).

Figure 10:
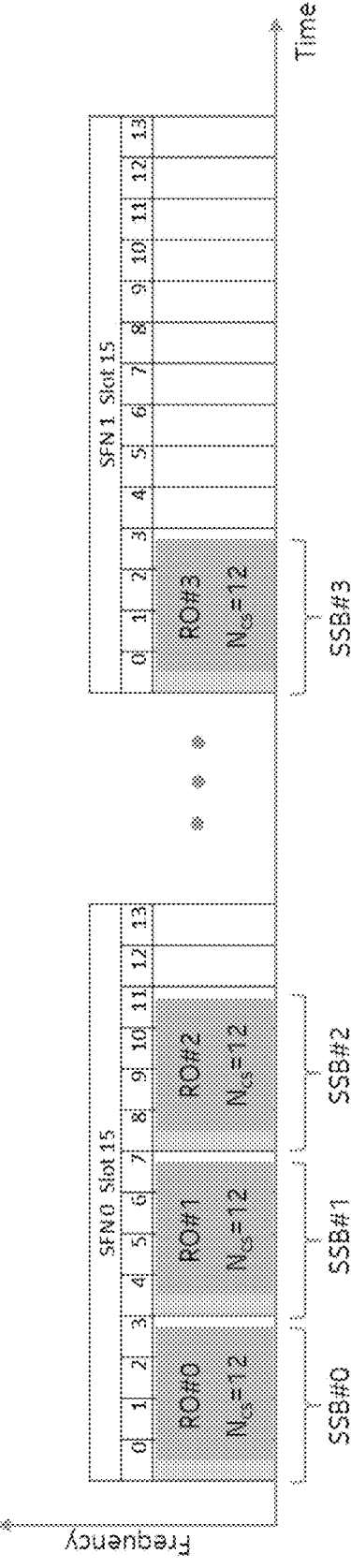
FIG. 10 is a diagram illustrating features as described herein.

The PRACH slot in subframe number (SFN) 0, slot 15 (950) may have enough time-frequency resources to host 3 ROs that are associated with SSB #0, SSB #1, and SSB #2, respectively. The PRACH slot in SFN 1, slot 15 (960) may have 1 RO that is associated with SSB #3. zeroCorrelationZoneConfig=3 means cyclic shift size $N_{CS}$=12. Accordingly, all 4 SSB s may have the same PRACH configuration for the corresponding PRACH occasions, as shown in FIG. 10. Referring now to FIG. 10, illustrated is an example of legacy RO assignment, which is uniform for all SSBs.

In an example embodiment, the PRACH configuration (e.g., PRACH preamble format and/or zeroCorrelationZoneConfig) may be different on a per SSB basis, according to different cell range in different spatial directions, especially when a network controlled repeater is present in the network.

In a $1^{st}$ aspect, in an example embodiment, SSB-specific PRACH configuration(s) may be implemented and/or utilized. In an example embodiment, the prach-ConfigurationIndex and zeroCorrelationZoneConfig parameters may be modified in a new RACH-ConfigGeneric IE to be SSB specific. More specifically, a subset of SSB beams may be assigned a PRACH configuration of a different preamble format and/or a different zeroCorrelationZoneConfig than the rest of the SSB beams. In an example embodiment, a SSB beam may be associated with a single SSB-specific PRACH configuration (i.e. only one SSB-specific PRACH configuration for each chosen subset of the SSB set). For example, a single first SSB subset (i.e. one or more radio beams) may be associated with a first PRACH configuration, while a single second, different SSB subset may be associated with a second, different PRACH configuration (e.g. different in terms of PRACH format or cyclic shift offset configuration), etc. In other words, a gNB may configure a UE with a plurality of SSB-specific PRACH configurations, each of which may be associated with only SSB beam.

Additionally or alternatively, as further described below with regard to a $2^{nd}$ aspect, a gNB may configure a UE with a plurality of SSB-specific PRACH configurations, where multiple PRACH configurations may be associated with each of a subset of the SSB set. For example, two or more PRACH configurations may be associated with a first SSB subset, while two or more different PRACH configurations may be associated with a second, different SSB subset. In an example embodiment, a different number of PRACH configurations may be associated with the first SSB subset than with the second SSB subset. In an example embodiment, the 1st aspect and the $2^{nd}$ aspect may be combined, such that a single first PRACH configuration is associated with a first SSB subset, while two or more second PRACH configurations are associated with a second SSB subset.

In an example embodiment, SSB-specific PRACH occasions of different time domain durations may be allocated to the PRACH slots according to the order of the SSB beam IDs, in compliance with Ssb-perRACH-OccasionAndCB-PreamblePerSSB and Msg1-FDM settings. In an example embodiment, the legacy prach-ConfigurationIndex may be split into prach-SlotConfigurationIndex and prach-PreambleConfigurationIndex. In an example embodiment, prach-SlotConfigurationIndex may define a plurality of time domain offsets of PRACH slots in a subframe. It may be determined using existing "Nf mod x=y", "subframe number", "starting symbol", and "number of PRACH slots within a subframe" fields in the legacy prach-ConfigurationIndex. These settings are not dependent on the cell range, and prach-SlotConfigurationIndex is cell specific. In an example embodiment, prach-PreambleConfigurationIndex may define a plurality of PRACH preamble formats. It may be determined using the existing "preamble format" field, "number of time-domain PRACH occasions within a PRACH slot" field, and "PRACH duration" fields in the legacy prach-ConfigurationIndex. Prach-PreambleConfigurationIndex may be SSB specific.

In an example embodiment, the gNB may broadcast the new RACH-ConfigGeneric IE in a SIB message, and the UE may determine the PRACH configuration and the PRACH occasion for PRACH transmission according to legacy cell search.

In an example embodiment, the zeroCorrelationZoneConfig for a subset of SSB s may need to be changed. For example, when the current preamble format (e.g., cyclic prefix and guard period length) is large enough, but the cyclic shift size $N_{CS}$ is not large enough to support the extended cell range in the spatial direction of the NCR, the SSB beam(s) that point in the direction of the NCR may be assigned a larger zeroCorrelationZoneConfig value.

Figure 11:
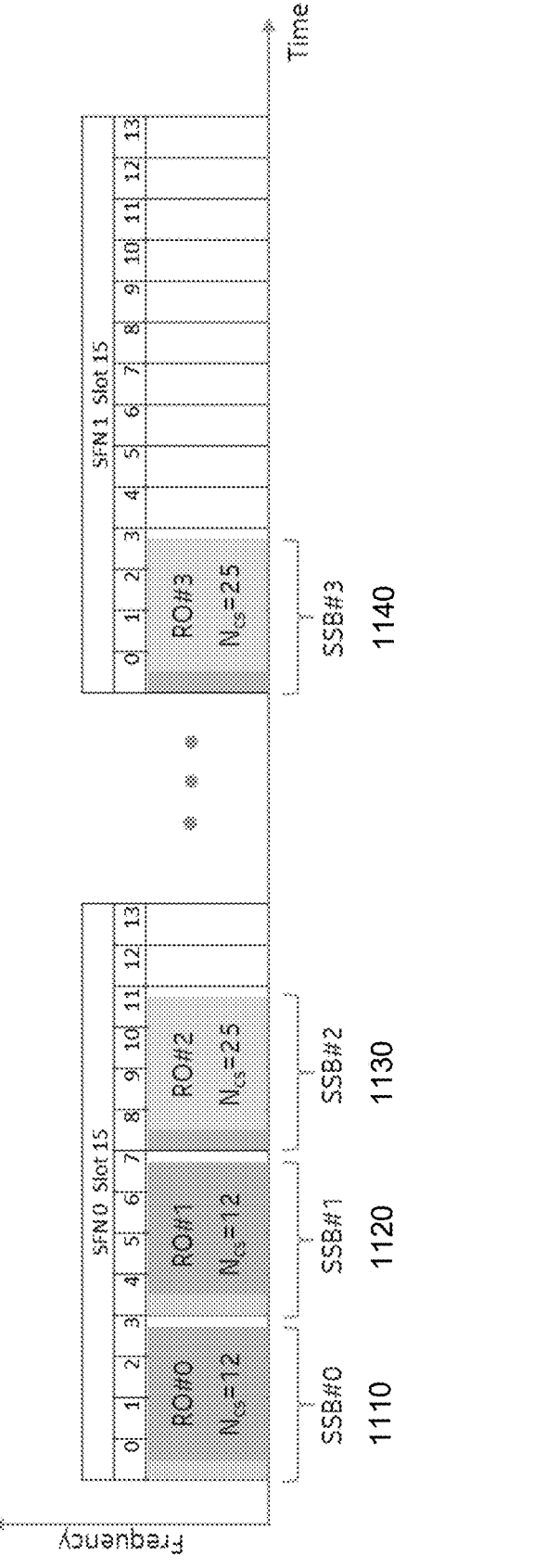
FIG. 11 is a diagram illustrating features as described herein.

Referring now to FIG. 11, illustrated is a non-limiting example of PRACH occasions with different cyclic shift size $N_{CS}$. SSB #2 (1130) and SSB #3 (1140) may be dedicated to the NCR and support UEs served by the NCR in the extended cell range. Comparing the examples of FIG. 11 with FIG. 10, even though the same PRACH preamble format A2 is used for all 4 RACH occasions, the preamble sequences are different. For RO #0 (1110) and RO #1 (1120), the original $N_{CS}$=12 (corresponding to zeroCorrelationZoneConfig 3) is used, but for RO #2 (1130) and RO #3 (1140) (which correspond to SSB #2 and SSB #3), new cyclic shift $N_{CS}$=25 (corresponding to zeroCorrelationZoneConfig 7) may be used to support the larger cell range. As a result, the preamble sequences for RO #2 (1130) and RO #3 (1140) may be different from those of RO #0 (1110) and RO #1 (1120).

In an example embodiment, both preamble format as well as $N_{CS}$ may need to be changed. In certain coverage scenarios, the extended cell range through the NCR may additionally require a different PRACH preamble format (1210) for the dedicated SSB #2 and SSB #3. In this example, format A3 may be needed. As shown in the non-limiting example of FIG. 12, which illustrates two preamble formats for the same PRACH slot configuration, format A3 has a PRACH duration (1220) of 6 symbols, whereas the original format A2 that has a PRACH duration (1220) of 4 symbols. In an example embodiment, for the SSB #2 and SSB #3 that are dedicated to the NCR (see FIG. 11), preamble format A3 may be used, whereas for SSB #0 and SSB #1, preamble format A2 may be sufficient, and may continue to be used. The $N_{CS}$ value for PRACH configuration associated with SSB #2 and SSB #3 may increase to $N_{CS}$=40 or zeroCorrelationZoneConfig 9, accordingly, to match with the extended cell range due to the NCR.

Figure 13:
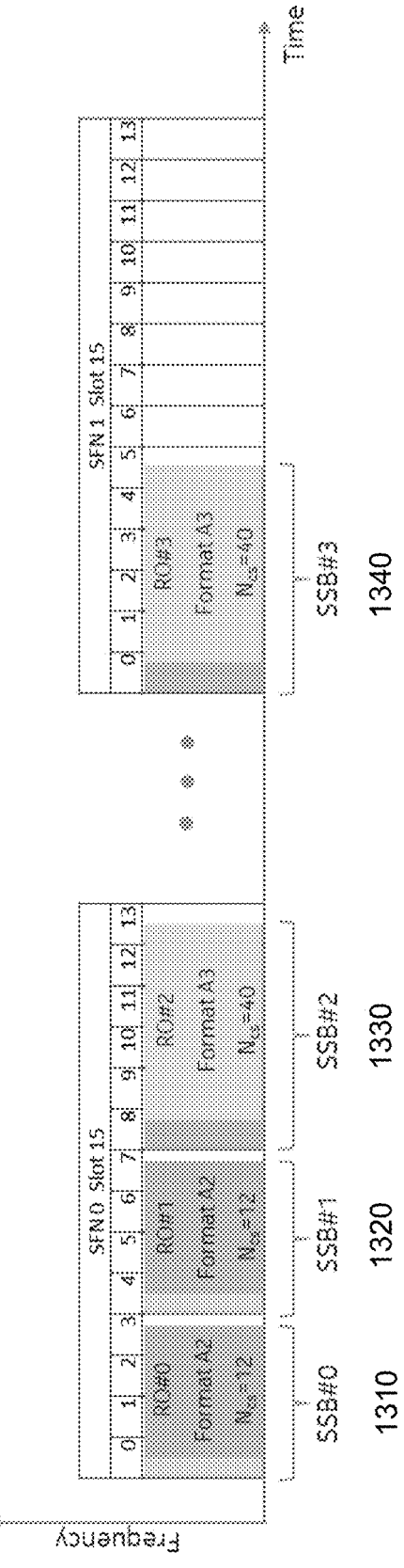
FIG. 13 is a diagram illustrating features as described herein.

Referring now to FIG. 13, illustrated is a non-limiting example of SSB to RO mapping for SSB specific PRACH formats. As shown in FIG. 13, RO #2 (1330) and RO #3 (1340) not only have different time duration from RO #0 (1310) and RO #1 (1320) (i.e. 5 symbols vs 4 symbols), they also have different preamble sequences as well (i.e. A3 vs A2).

Comparing FIG. 13 and FIG. 11, one may observe that both the shorter and the longer time domain duration ROs may be sequentially allocated to the PRACH slots in the same order as the SSB beam indices.

In an example embodiment, frequency division (FD) multiplexing may be configured, and preamble format as well as the $N_{CS}$ may need to be changed. In the same scenario as FIG. 13, but with frequency domain multiplexing configuration of 2 RACH channels (1390, 1395) per PRACH occasion (i.e., Msg1-FDM=two), illustrated in FIG. 14 is SSB to RO mapping for SSB specific PRACH formats with FDM=2.

Figure 14:
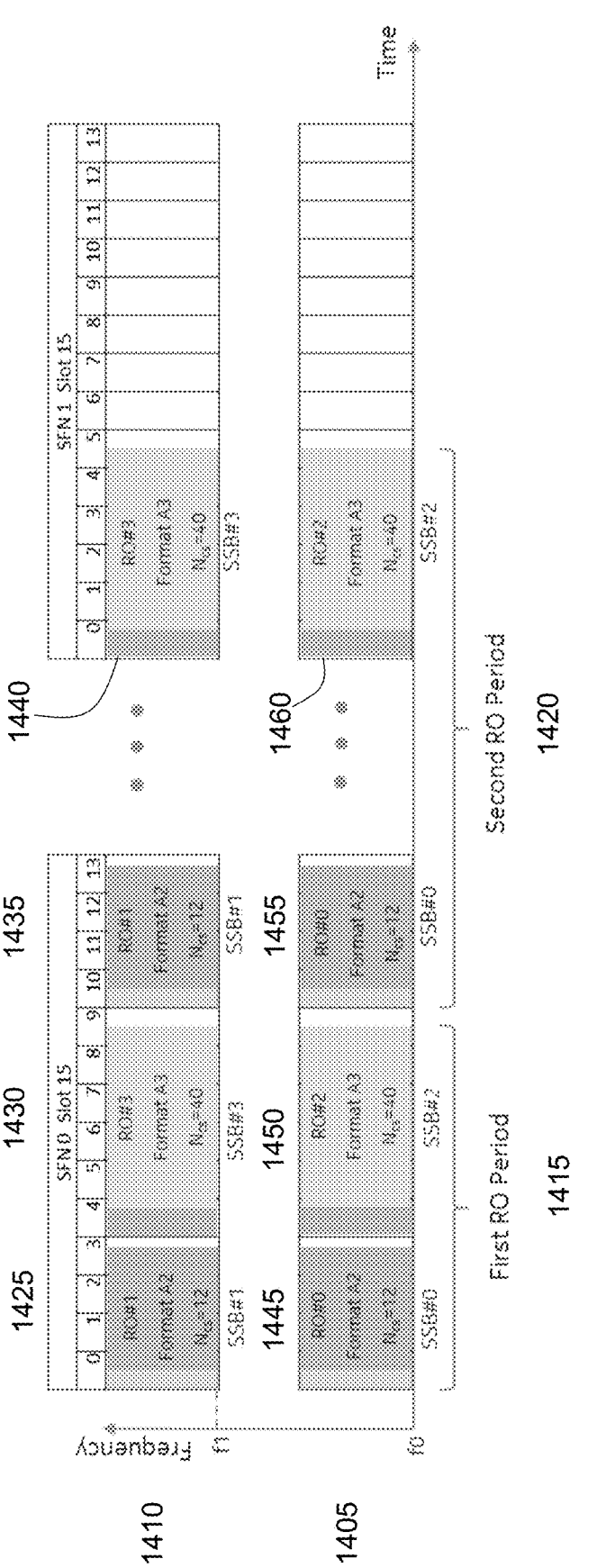
FIG. 14 is a diagram illustrating features as described herein.

In the non-limiting example of FIG. 14, in SFN 0 slot 15 and SFN 1 slot 15, there may be 2 RACH channels at different frequency offsets f0 (1405) and f1 (1410). SSB #0 (1445, 1455) and SSB #1 (1425, 1435) are gNB direct beams (i.e. no repeater), and the corresponding PRACH preamble format is A2 and the cyclic shift size $N_{CS}$ is 12. SSB #2 (1450, 1460) and SSB #3 (1430, 1440) are dedicated to the NCR and the corresponding PRACH preamble format is A3 and the cyclic shift size $N_{CS}$ is 40. In a FD multiplexing case, the PRACH occasions are allocated along the frequency domain direction first, then time domain direction. As can be observed in the example of FIG. 14, the ROs of different time durations may be allocated into the PRACH slots in the same frequency-time order (e.g. in first RO period 1415). Due to the FD multiplexing, there are enough time and frequency resources in the PRACH slots to repeat the 4 ROs for one additional full RO period (e.g. second RO period 1420, including 1455, 1435, 1440, 1460).

In a 2nd aspect, in an example embodiment, each SSB may have more than one PRACH configuration. In an example embodiment, each SSB beam ID may be associated with more than one (e.g. two) PRACH configurations in a new RACH-ConfigGeneric IE. These PRACH configurations may use different settings in the prach-ConfigurationIndex element and/or a different zeroCorrelationZoneConfig element.

In an example embodiment, the first and the second PRACH configurations may place their respective RACH slots at different frequency offsets, wherein the PRACH occasions of the respective PRACH configuration may be allocated to the respective PRACH slots.

In an example embodiment, the first and the second PRACH configurations may place their respective RACH slot at the same frequency offset, wherein the PRACH occasions of different PRACH configurations may be superimposed (i.e., at least partially overlap in time and frequency) and may still be associated with one SSB beam ID. In an example embodiment, the PRACH occasion of the longer time duration may be used as the combined duration of PRACH occasion when allocating RACH occasion into the shared PRACH slots.

In an example embodiment, the gNB may send the new RACH-ConfigGeneric element in a SIB message to the UE. The UE may decide which PRACH configuration to use for the PRACH preamble transmission. In an example embodiment, one of the PRACH configuration may be completely legacy compliant, whereas the one or more other PRACH configuration may be associated with cell range extension due to the presence of NCR. Legacy UEs (Release 17 or earlier) may use the legacy PRACH configuration to be backward compatible.

In another example embodiment, there may be an indicator in the RACH-ConfigGeneric IE to indicate which of the two PRACH configurations is the default configuration. The default PRACH configuration may be associated with the maximum cell range including the range extension introduced by the NCR (i.e. worst case configuration). The UE may select the PRACH configuration based on the default indicator. In another example embodiment, Release 18 UEs may autonomously select the first or second PRACH configuration based on its own detection of the presence of the NCR by way of propagation delay comparison (e.g., TDOA measurement, etc.) between SSB beams that are received from the gNB directly and the SSB beams that are received after amplify-forwarding through the repeater, enhanced positioning with or without assistance data from the gNB, or other AI/ML based methods.

Figure 15:
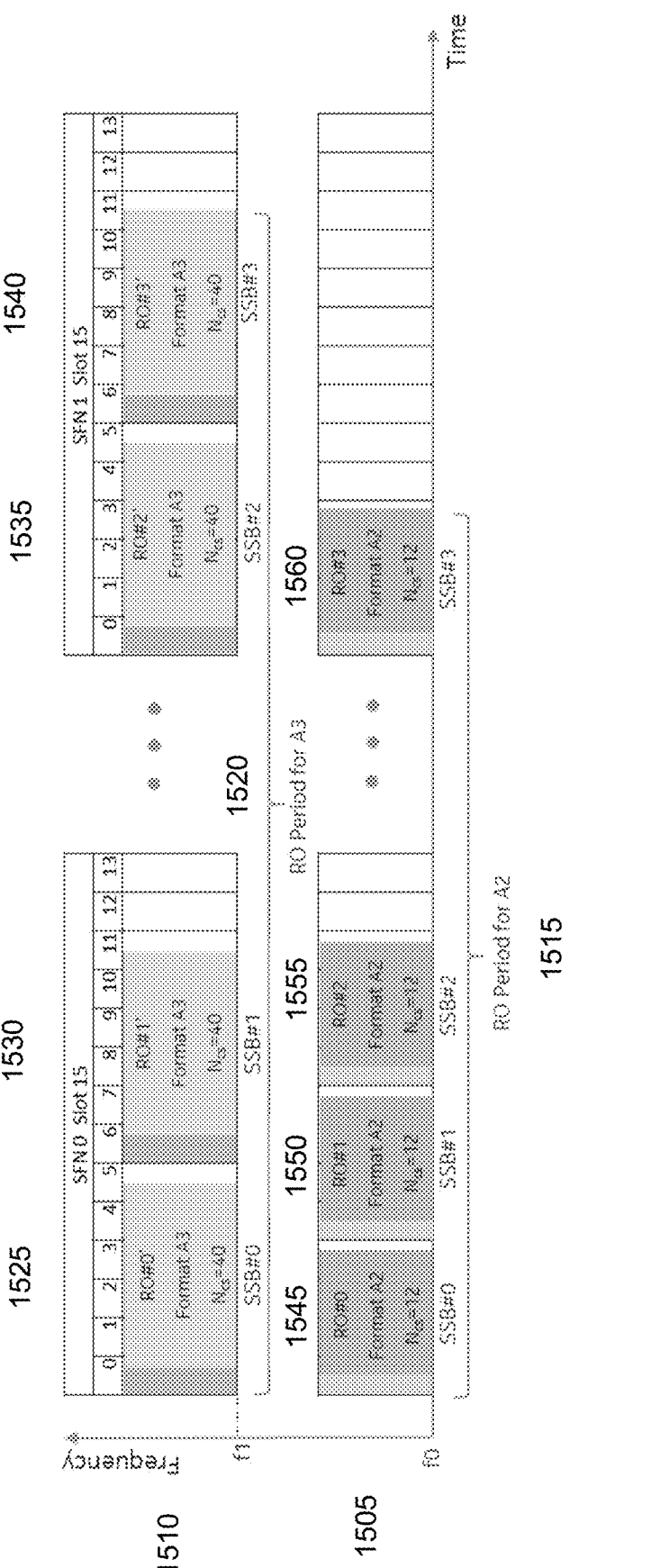
FIG. 15 is a diagram illustrating features as described herein.

In an example embodiment, the (plural) PRACH configurations may occupy different frequency subbands. In an example, there may still be 4 SSBs, namely SSB #0, SSB #1, SSB #2, and SSB #3, as shown in the example baseline configurations of FIGS. 10, 11, and 12. In an example embodiment, each SSB may be associated with 2 PRACH configurations, as shown in FIG. 15, in which the SSB #0 (1545, 1525), SSB #1 (1550, 1530), SSB #2 (1555, 1535), and SSB #3 (1560, 1540) may be simultaneously associated with RO #0 (1545), RO #1 (1550), RO #2 (1555), RO #3 (1560) and RO #0' (1525), RO #1' (1530), RO #2' (1535), and RO #3' (1540), respectively. In the example of FIG. 15, RO #0' to RO #3' use preamble format A3 and NCS=40 during RO period for A3 (1520), whereas RO #0 to RO #3 use preamble format A2 and NCS=12 during RO period for A2 (1515). In the example, each set of ROs occupies a different frequency subband, which is represented by the frequency offset f0 (1505) and f1 (1510). These frequency offsets may not be identical to Msg1-FDM. In an example embodiment, the gNB may indicate to the UE which PRACH configuration to take/use. Alternatively, the intended PRACH configuration may be implied by the order when one or more PRACH configurations are declared in the RACH-ConfigGeneric. A UE may also determine, autonomously, which PRACH configuration to use according to its detection of the presence of the NCR by way of measuring the time difference of arrival between SSB s, enhanced positioning with or without assistance data and/or AL/ML models, etc.

Figure 16:
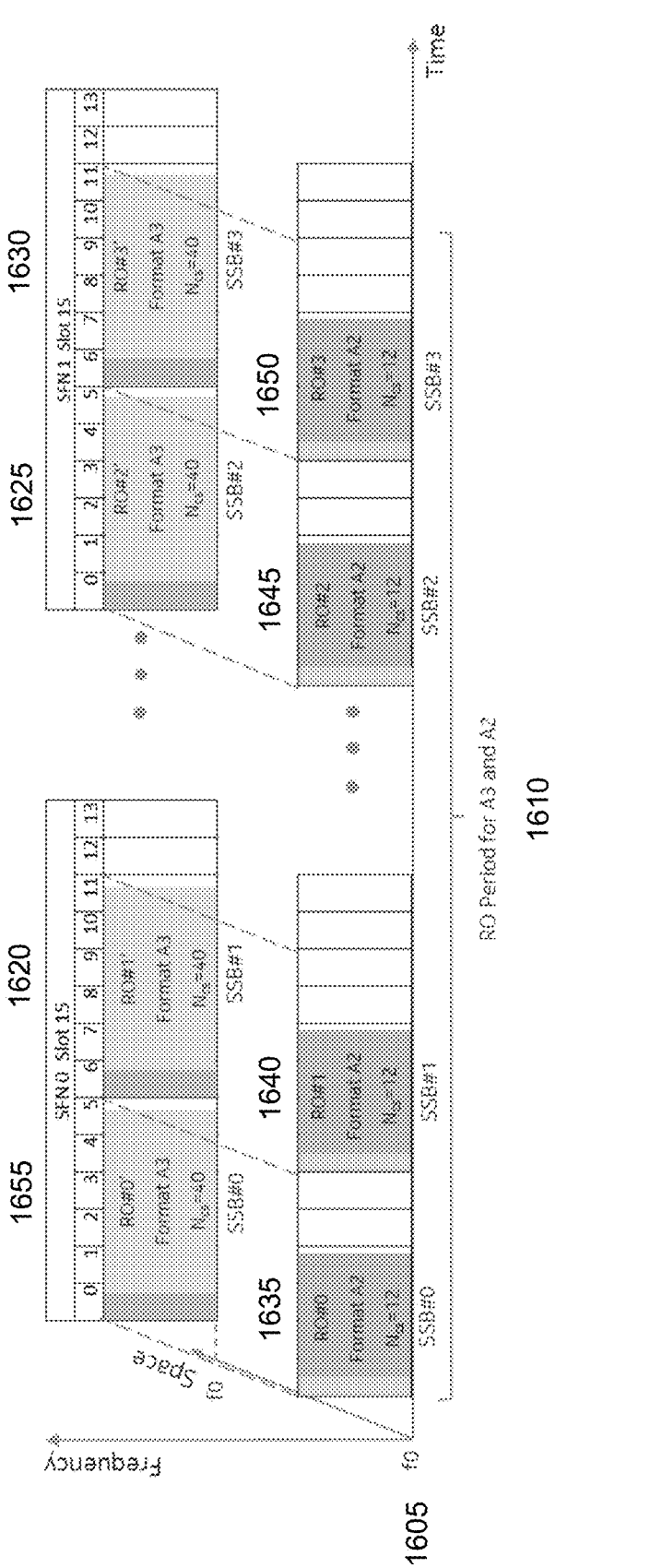
FIG. 16 is a diagram illustrating features as described herein.

In an example embodiment, PRACH configurations may share the same frequency subband. The two sets of PRACH configurations may share the same time-frequency resources as shown in the non-limiting example of FIG. 16, wherein the RO #0 to RO #3 and RO #0' to RO #3' have the same frequency offset f0 (1605). In an example embodiment, the PRACH occasion of the longer time duration (in the example of FIG. 16 format A3) may be used as the combined duration of the PRACH occasion to be allocated to the PRACH slots. The shorter duration RO (in the example of FIG. 16 Format A2) may be superimposed to the longer time duration. Accordingly, the combined RO may still map to one SSB beam index (see e.g. 1635 and 1655; 1620 and 1640; 1625 and 1645; 1630 and 1650). In the example of FIG. 16, this is illustrated by the dotted lines, which show the duration of the format A3 time duration relative to the format A2 time duration. There may be a single RO period for A3 and A2 formats (1610).

The example of FIG. 16 illustrates SSB that has two ROs mapped over the same frequency resources. The examples of FIGS. 8-16 may be considered illustrative, but not limiting; other scenarios may be possible according to example embodiments of the present disclosure.

In an example embodiment, SSB specific PRACH configuration(s) may be enabled. In an example embodiment, one SSB beam ID may have a different PRACH configuration from another SSB beam ID. In an example embodiment, a new method to separate the PRACH slot configuration and PRACH preamble format configuration may be implemented. In an example embodiment, a new method to arrange PRACH occasions of different time durations in the PRACH slots may be implemented. In an example embodiment, one SSB beam ID may have more than one PRACH configurations, for example through an indicator. In an example embodiment, the selection of PRACH configurations may be driven by the UE. In an example embodiment, new SIB content in RACH-ConfigGeneric section may be included to support SSB-specific PRACH configuration.

In an example embodiment, SSB beam-based PRACH planning may be implemented for the network, as opposed to cell specific PRACH planning. In an example embodiment, if different spatial directions may use different PRACH formats and zeroCorrelationZone Configurations, then the beam from a neighboring cell may also plan the PRACH format and zeroCorrelationZone configuration that aims to improve the orthogonality of the PRACH sequences and improve PRACH detection performance. This may also improve the root sequence re-usability. A technical effect of example embodiments of the present disclosure may be to enable finer granularity cell planning (with better performance), taking the shape of the cell coverage in consideration.

Referring now to FIG. 17, illustrated is an exemplary flow chart of the steps that a gNB may take to support one or more SSB-specific PRACH configurations. A gNB may collect information (1710) on the shape the of coverage area during initial cell planning or the initial deployment, e.g., information such as the cell range in the spatial directions that do not have the NCR, the cell range of the spatial directions with the NCR; the number and the indices of the SSB beams that are dedicated to the NCR; the internal group delay of the NCR, etc.

If the PRACH configuration is SSB specific (Aspect 1, 1720), the gNB may determine the optimal PRACH configuration according to the cell range in each spatial direction (1730). The spatial directions may be directions that each SSB beam of the cell represents. In an example embodiment, the gNB may select the PRACH format that has the correct/corresponding preamble format and/or the cyclic shift of the root sequence $N_{CS}$ (i.e., zeroCorrelationZoneConfig). The gNB may associate the optimal PRACH configuration with the corresponding subset of SSB beam IDs. The gNB may subsequently aggregate all the per SSB PRACH configurations into a RACH-ConfigGeneric IE within a SIB message (1740), and transmit that SIB message to all UEs in the coverage area (1780).

If more than one PRACH configuration is available on a per SSB basis (Aspect 2, 1750), the gNB may determine the optimal PRACH configuration to use according to the cell range that does not include an NCR, and according to the cell range that does includes an NCR (1760). The gNB may subsequently aggregate all two or more PRACH configurations into a RACH-ConfigGeneric IE within a SIB message (1770), optionally with a default indicator to instruct the UE which PRACH configuration to fall back to. In an example, at least one default PRACH configuration and at least one SSB-specific PRACH configuration may each be included. In another example, two or more SSB-specific PRACH configurations may be included, along with a default indicator that may mark one or the configurations as a fall back/default/safe configuration (e.g. for a larger cell range). The UE may choose a default configuration if, for example, it can't determine its location with high/enough confidence. The gNB may then transmit that SIB message to all UEs in the coverage area (1780). The SIB message may or may not be transmitted with use of the repeater. For example, this information may be transmitted to all users, and may be carried in all radio beams of the gNB; some UE may receive the SIB message via one or more repeaters, while other UE may receive the SIB message directly from the gNB, without use of the repeater.

Referring now to FIG. 18, illustrated is an exemplary flow chart of the steps that a UE may take, according to example embodiments of the present disclosure. A UE may search for SSBs during the periodic SSB burst and may determine the strongest SSB beam based on various criteria (e.g. beam selection), such as the quality of the SSB signal (e.g., RSRQ, RSRQ) (1810). Additionally or alternatively, the UE may select a SSB beam based on timing (e.g. TAC) considerations. In an example embodiment, the UE may select an SSB beam that is received via a repeater, such as an NCR. In an example embodiment, the UE may select an SSB beam based on a determination that it is received via a repeater. In addition, the UE may also determine the SSB beam ID by demodulating the strongest beam and achieving downlink synchronization. The UE may receive the downlink SIB message (1820), which may comprise the PRACH configurations in a RACH-ConfigGeneric IE. The strongest beam detected by the UE may be a beam directly from a base station, or may be a beam transmitted from the base station to the UE via a repeater. If the beam is directly from the base station, the UE may select a PRACH configuration associated with direct communication with the base station (e.g. cell specific PRACH configuration or legacy PRACH configuration). If the beam is received from the base station via a repeaters, the UE may select an SSB specific PRACH configuration according to an example embodiment of the present disclosure.

If the PRACH configuration is SSB specific (Aspect 1, 1830), the UE may determine the PRACH configuration in RACH-ConfigGeneric IE that may be associated with a subset of SSB beam IDs, wherein the detected SSB beam ID of the strongest beam belongs to the subset (1840). The UE may subsequently determine the PRACH occasion that corresponds to the detected SSB beam ID, and may send the specified PRACH preamble at the specified PRACH occasion (1870).

If the detected SSB beam ID has more than one PRACH configurations (Aspect 2, 1850), the UE may select the appropriate PRACH configuration according to either the default indicator in the RACH-ConfigGeneric IE (from the gNB), or based on various criteria, such as its self-estimated propagation delay to the gNB (1860). The latter may include the UE's ability to detect the presence of the NCR through methods such as measurement on time difference of arrival (TDOA) between SSB beams that are received from the gNB directly and the SSB beams that are received after amplify-forwarding through the repeater, RF fingerprinting/sidelink communications to estimate the UE position and certain AI/ML models for mobility tracking, etc. The UE may subsequently determine the PRACH occasion that corresponds to the detected SSB beam ID, and may send the specified PRACH preamble at the specified PRACH occasion (1870). The gNB (or network node) may be able to determine the location of the UE (i.e., whether it is served by the gNB directly or served by the gNB through an NCR), according to the PRACH preamble it detects at the specified PRACH occasion.

Referring now to FIG. 19, illustrated is an example of a SSB specific PrachConfiguration Message format, more specifically an example of a new RACH-ConfigGeneric IE that supports SSB-specific PRACH configuration(s). In an example embodiment of the present disclosure, a new PerSSBRAConfigurationList element (1910) may be included, which may comprise a number of PerSSBRAConfiguration elements (1920). Each of the PerSSBRAConfiguration elements (1920) may include the prach-PreambleConfigurationIndex (1930), the zeroCorreclationZoneConfig (1940), and the subset of SSB s that are associated with this configuration (1950). The prach-SlotConfigurationIndex (1960) may still be cell specific, and it may be included at the root level of RACH-ConfigGeneric (1970).

Referring now to FIG. 20, illustrated is an example of a new RACH-ConfigGeneric message structure that supports more than one PRACH configurations for each SSB. In an example embodiment, a new PerSSBRAConfigurationList element (2010) may be included in the RACH-ConfigGeneric IE (2020), which may comprise a number of PerSSBRAConfiguration elements (2030). Each of the PerSSBRAConfiguration elements (2030) may include the prach-ConfigurationIndex element (2040), the zeroCorrelationZoneConfig element (2050), the frequency domain offset (2060) and the default indicator of the corresponding configuration (2070). The gNB may indicate one PerSSBRAConfiguration as the default configuration by setting the respective default indicator (2070) to, for example, one.

It may be noted that the above described example message formats (i.e. FIGS. 19-20) are to be considered exemplary and not restrictive. Any person skilled in the art may recognize that the example message formats may be embodied in many other specific forms without departing from the spirit or scope of the disclosure herein.

It may be noted that, in FIGS. 19-20, strikethrough is used for illustrative purposes to signify that a parameter is no longer applicable to per SSB configuration(s). However, all legacy IEs may be included for backwards compatibility. New IEs may only be applicable to UEs that support PRACH configuration(s) according to example embodiments of the present disclosure.

A technical effect of example embodiments of the present disclosure may be to enable better PRACH detection performance, as the SSB specific PRACH configuration may ensure that PRACH is always optimal for the cell range in all the spatial directions of the cell coverage area. A technical effect of example embodiments of the present disclosure may be to avoid the performance degradation in the state of the art solution (i.e., cell specific RACH configuration).

A technical effect of example embodiments of the present disclosure according to the 2nd aspect, where each SSB may have more than one PRACH configuration associated, may be to provide a design and deployment flexibility such that the location of the NCR does not have to be known ahead of time (i.e. it is not tied to a subset of SSB s, as in the 1st aspect). In other words, by associating multiple PRACH configurations with each SSB, the UE may be able to select an appropriate PRACH configuration regardless of the location of the NCR, as at least one PRACH configuration may work for the current NCR location.

A technical effect of example embodiments of the present disclosure may be to improve spectral efficiency, since PRACH resources may be configured independently and optimally for UE's communicating both directly with the gNB, and indirectly via an NCR.

A technical effect of example embodiments of the present disclosure may be to allow for backward compatibility, as both the 1st aspect and the 2nd aspect support a fall back solution of a single PRACH configuration for all SSBs. The 2nd aspect (more than one PRACH configuration per SSB) may have the technical effect of being backward compatible to legacy UEs.

A technical effect of example embodiments of the present disclosure may be applicability to a number of other use cases where the coverage area is non-conventional. For example, in multi-hop NCRs situation (not yet supported in 3GPP but may in the future), and/or spatial dependent coverage constraints due to regulatory requirement or terrain (e.g., urban canyon).

It may be noted that the SSB-specific PRACH configuration signaling (e.g. RACH-ConfigGeneric in a SIB message) may impact 38.331. It may be noted that associating the SSB beams and RACH occasions may impact 38.213 (e.g. non-uniform RO resource assignment due to different PRACH preamble format or NCS in PRACH slots). It may be noted that the separation of the prach-ConfigurationIndex into prach-SlotConfigurationIndex and prach-PreambleConfigurationIndex may impact 38.211. It may be noted that the SSB specific PRACH signaling may impact 38.106 (NR Repeater), as it is one of the main use cases that exhibit significantly different cell range in different spatial directions.

A technical effect of example embodiments of the present disclosure may be to address PRACH detection performance degradation due to cell range extension through deployment of network controlled repeaters. By making the PRACH configuration SSB dependent, example embodiments of the present disclosure may have the technical effect of ensuring optimal PRACH performance both in the spatial directions that do not have the repeater, as well as the spatial directions with the repeater.

Example embodiments of the present disclosure may relate to beam-specific PRACH configurations. The same resources may be implicated by the different PRACH configurations, but with different PRACH preamble format, number of PRACH occasions per PRACH slot, and/or different PRACH duration indicated.

Example embodiments of the present disclosure may relate to use of a beam-specific RACH-ConfigCommon element. Example embodiments of the present disclosure may involve SSB beam IDs being associated with different PRACH signal configuration(s).

Example embodiments of the present disclosure may relate to configuring and using more than one PRACH configuration per SSB beam. Example embodiments of the present disclosure may relate to how the UE selects a PRACH configuration in a given scenario.

FIG. 21 illustrates the potential steps of an example method 2100. The example method 2100 may include: receiving information comprising at least: an indication of a first physical random access channel configuration, wherein the first physical random access channel configuration is associated with an identifier of at least one first radio beam, and an indication of a second physical random access channel configuration, wherein the second physical random access configuration is at least partially different from the first physical random access channel configuration, wherein the second physical random access channel configuration is associated with an identifier of at least one second radio beam, wherein the at least one second radio beam comprises, at least, a radio beam for communicating with a network node via a repeater, 2110; selecting a radio beam, 2120; selecting a physical random access channel configuration based, at least partially, on the received information, 2130; and transmitting, to the network node, a radio access preamble on the selected radio beam according to the selected physical random access channel configuration, 2140.

FIG. 22 illustrates the potential steps of an example method 2200. The example method 2300 may include: determining that a repeater is present in a cell of the apparatus, 2310; transmitting, to a user equipment, information comprising at least: an indication of a first physical random access channel configuration, wherein the first physical random access channel configuration is associated with an identifier of at least one first radio beam, and an indication of a second physical random access channel configuration, wherein the second physical random access configuration is at least partially different from the first physical random access channel configuration, wherein the second physical random access channel configuration is associated with an identifier of at least one second radio beam, wherein the at least one second radio beam comprises, at least, a radio beam for communicating via the repeater, 2220; receiving, from the user equipment, a radio access preamble on a radio beam according to a physical random access channel configuration indicated with the transmitted information, 2230.

FIG. 23 illustrates the potential steps of an example method 2300. The example method 2300 may include: receiving, from a user equipment, a radio access preamble on a radio beam according to a physical random access channel configuration, wherein the physical random access channel configuration comprises at least one of: a first physical random access channel configuration, wherein the first physical random access channel configuration is associated with an identifier of at least one first radio beam, or a second physical random access channel configuration, wherein the second physical random access configuration is at least partially different from the first physical random access channel configuration, wherein the second physical random access channel configuration is associated with an identifier of at least one second radio beam, wherein the at least one second radio beam comprises a radio beam for communicating via the apparatus, 2310; and transmitting the received radio access preamble to a network node, 2320.

In accordance with one example embodiment, an apparatus may comprise: at least one processor; and at least one memory including computer program code; the at least one memory and the computer program code configured to, with the at least one processor, cause the apparatus at least to: receive information comprising at least: an indication of a first physical random access channel configuration, wherein the first physical random access channel configuration may be associated with an identifier of at least one first radio beam, and an indication of a second physical random access channel configuration, wherein the second physical random access configuration may be at least partially different from the first physical random access channel configuration, wherein the second physical random access channel configuration may be associated with an identifier of at least one second radio beam, wherein the at least one second radio beam may comprise, at least, a radio beam for communicating with a network node via a repeater; select a radio beam; select a physical random access channel configuration based, at least partially, on the received information; and transmit, to the network node, a radio access preamble on the selected radio beam according to the selected physical random access channel configuration.

Selecting the physical random access channel configuration may comprise the example apparatus being further configured to: select the physical random access channel configuration based, at least partially, on an identifier of the selected radio beam; determine a physical random access channel occasion based, at least partially, on the identifier of the selected radio beam; and transmit the radio access preamble at the determined physical random access channel occasion.

Selecting the physical random access channel configuration for the selected radio beam may comprise the example apparatus being further configured to: select the physical random access channel configuration based, at least partially, on at least one of: the identifier of the selected radio beam, a default configuration indicator received from the network node, or an estimated propagation delay to the network node; determine a physical random access channel occasion based, at least partially, on at least one of: the identifier of the selected radio beam, the default configuration indicator, or the estimated propagation delay; and transmit the radio access preamble at the determined physical random access channel occasion.

The at least one first radio beam may be at least partially different from the at least one second radio beam.

The selected radio beam may be associated with a synchronization signal block beam.

The first physical random access channel configuration may comprise at least one of an indication of a first preamble format or an indication of a first cyclic shift offset for determination of a first preamble sequence, wherein the second physical random access channel configuration may comprise an indication of at least one of a second preamble format or an indication of a second cyclic shift offset for determination of a second preamble sequence, wherein the first preamble format may be at least partially different from the second preamble format, wherein the first cyclic shift offset may be at least partially different from the second cyclic shift offset, and wherein the second physical random access channel configuration may be configured to enable a longer cell range than the first physical random access channel configuration.

The selected physical random access channel configuration may comprise the second physical random access channel configuration.

The identifier associated with the selected radio beam may be associated with a plurality of physical random access channel configurations, wherein selecting the physical random access channel configuration may comprise the example apparatus being further configured to: select the physical random access channel configuration based, at least partially, on at least one criterion.

The example apparatus may be further configured to: select the second physical random access channel configuration as the selected physical random access channel configuration in response to a determination that the selected radio beam is received from the network node via the repeater; or select the first physical random access channel configuration as the selected physical random access channel configuration in response to a determination that the selected radio beam is received directly from the network node, without the repeater.

A cell of the network node may comprise a plurality of radio beams, wherein the received information may further comprise an indication that a subset of radio beams of the plurality of radio beams are respectively associated with at least two physical random access channel configurations.

At least one radio beam of the plurality of radio beams may be associated with at least one single physical random access channel configuration.

Two or more physical random access channel configurations may be associated with an identifier of the selected radio beam, wherein the two or more physical random access channel configurations may respectively indicate one or more random access channel slots that are placed at physical random access channel configuration-specific frequency areas.

The physical random access channel configuration-specific frequency areas may not overlap.

The physical random access channel configuration-specific frequency areas may partially or fully overlap.

The physical random access channel configuration-specific frequency areas may be specified with physical random access channel configuration-specific frequency offsets.

The selected physical random access channel configuration may comprise at least one of: an indication of an associated radio beam identifier, an indication of a radio access preamble format, an indication of a physical random access channel occasion, an indication of a cyclic prefix associated with the physical random access channel occasion, an indication of a sequence length associated with the physical random access channel occasion, an indication of a guard period length associated with the physical random access channel occasion, an indication of a number of physical random access channel occasions associated with a physical random access channel slot, an indication of a duration associated with the physical random access channel occasion, an indication of a cyclic shift offset, or an indication of a cyclic shift size.

In accordance with one aspect, an example method may be provided comprising: receiving information comprising at least: an indication of a first physical random access channel configuration, wherein the first physical random access channel configuration may be associated with an identifier of at least one first radio beam, and an indication of a second physical random access channel configuration, wherein the second physical random access configuration may be at least partially different from the first physical random access channel configuration, wherein the second physical random access channel configuration may be associated with an identifier of at least one second radio beam, wherein the at least one second radio beam may comprise, at least, a radio beam for communicating with a network node via a repeater; selecting a radio beam; selecting a physical random access channel configuration based, at least partially, on the received information; and transmitting, to the network node, a radio access preamble on the selected radio beam according to the selected physical random access channel configuration.

In accordance with one example embodiment, an apparatus may comprise: circuitry configured to perform: receive information comprising at least: an indication of a first physical random access channel configuration, wherein the first physical random access channel configuration may be associated with an identifier of at least one first radio beam, and an indication of a second physical random access channel configuration, wherein the second physical random access configuration may be at least partially different from the first physical random access channel configuration, wherein the second physical random access channel configuration may be associated with an identifier of at least one second radio beam, wherein the at least one second radio beam may comprise, at least, a radio beam for communicating with a network node via a repeater; select a radio beam; select a physical random access channel configuration based, at least partially, on the received information; and transmit, to the network node, a radio access preamble on the selected radio beam according to the selected physical random access channel configuration.

In accordance with one example embodiment, an apparatus may comprise: processing circuitry; memory circuitry including computer program code, the memory circuitry and the computer program code configured to, with the processing circuitry, enable the apparatus to: receive information comprising at least: an indication of a first physical random access channel configuration, wherein the first physical random access channel configuration may be associated with an identifier of at least one first radio beam, and an indication of a second physical random access channel configuration, wherein the second physical random access configuration may be at least partially different from the first physical random access channel configuration, wherein the second physical random access channel configuration may be associated with an identifier of at least one second radio beam, wherein the at least one second radio beam may comprise, at least, a radio beam for communicating with a network node via a repeater; select a radio beam; select a physical random access channel configuration based, at least partially, on the received information; and transmit, to the network node, a radio access preamble on the selected radio beam according to the selected physical random access channel configuration.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: receiving information comprising at least: an indication of a first physical random access channel configuration, wherein the first physical random access channel configuration may be associated with an identifier of at least one first radio beam, and an indication of a second physical random access channel configuration, wherein the second physical random access configuration may be at least partially different from the first physical random access channel configuration, wherein the second physical random access channel configuration may be associated with an identifier of at least one second radio beam, wherein the at least one second radio beam may comprise, at least, a radio beam for communicating with a network node via a repeater; selecting a radio beam; selecting a physical random access channel configuration based, at least partially, on the received information; and transmitting, to the network node, a radio access preamble on the selected radio beam according to the selected physical random access channel configuration.

In accordance with one example embodiment, a non-transitory computer-readable medium comprising program instructions stored thereon which, when executed with at least one processor, cause the at least one processor to: cause receiving of information comprising at least: an indication of a first physical random access channel configuration, wherein the first physical random access channel configuration may be associated with an identifier of at least one first radio beam, and an indication of a second physical random access channel configuration, wherein the second physical random access configuration may be at least partially different from the first physical random access channel configuration, wherein the second physical random access channel configuration may be associated with an identifier of at least one second radio beam, wherein the at least one second radio beam may comprise, at least, a radio beam for communicating with a network node via a repeater; select a radio beam; select a physical random access channel configuration based, at least partially, on the received information; and cause transmitting, to the network node, of a radio access preamble on the selected radio beam according to the selected physical random access channel configuration.

In accordance with another example embodiment, a non-transitory program storage device readable by a machine may be provided, tangibly embodying a program of instructions executable by the machine for performing operations, the operations comprising: cause receiving of information comprising at least: an indication of a first physical random access channel configuration, wherein the first physical random access channel configuration may be associated with an identifier of at least one first radio beam, and an indication of a second physical random access channel configuration, wherein the second physical random access configuration may be at least partially different from the first physical random access channel configuration, wherein the second physical random access channel configuration may be associated with an identifier of at least one second radio beam, wherein the at least one second radio beam may comprise, at least, a radio beam for communicating with a network node via a repeater; select a radio beam; select a physical random access channel configuration based, at least partially, on the received information; and cause transmitting, to the network node, of a radio access preamble on the selected radio beam according to the selected physical random access channel configuration.

In accordance with one example embodiment, an apparatus may comprise: at least one processor; and at least one memory including computer program code; the at least one memory and the computer program code configured to, with the at least one processor, cause the apparatus at least to: determine that a repeater may be present in a cell of the apparatus; transmit, to a user equipment, information comprising at least: an indication of a first physical random access channel configuration, wherein the first physical random access channel configuration may be associated with an identifier of at least one first radio beam, and an indication of a second physical random access channel configuration, wherein the second physical random access configuration may be at least partially different from the first physical random access channel configuration, wherein the second physical random access channel configuration may be associated with an identifier of at least one second radio beam, wherein the at least one second radio beam may comprise, at least, a radio beam for communicating via the repeater; and receive, from the user equipment, a radio access preamble on a radio beam according to a physical random access channel configuration indicated with the transmitted information.

The example apparatus may be further configured to: determine a location of the user equipment based, at least partially, on: the physical random access channel configuration according to which the radio access preamble may be received on the radio beam, and a physical random access channel occasion during which the radio access preamble may be received on the radio beam.

The at least one first radio beam may be at least partially different from the at least one second radio beam.

The example apparatus may be further configured to: determine a shape of coverage of the cell; determine a delay associated with the repeater; and determine the second physical random access channel configuration based, at least partially, on the shape of the coverage of the cell and the delay associated with the repeater.

The example apparatus may be further configured to: determine respective physical random access channel configurations for respective directions of a plurality of radio beams of the cell based, at least partially, on coverage of the cell; and determine at least one physical random access channel configuration based, at least partially, on the respective physical random access channel configurations, wherein the at least one physical random access channel configuration may comprise, at least, the second physical random access channel configuration.

The example apparatus may be further configured to: determine first respective physical random access channel configurations for respective directions of a plurality of radio beams of the cell based, at least partially, on coverage of the cell without the repeater; determine second respective physical random access channel configurations for the respective directions of the plurality of radio beams of the cell based, at least partially, on coverage of the cell with the repeater; determine at least two physical random access channel configurations for a radio beam of the plurality of radio beams based, at least partially, on the first respective physical random access channel configurations and the second respective physical random access channel configurations; and determine a default configuration indicator, wherein the information may comprise, at least, an indication of the at least two physical random access channel configurations for the radio beam and the default configuration indicator.

The radio beam on which the radio access preamble is received may be associated with a synchronization signal block beam.

The first physical random access channel configuration may comprise at least one of an indication of a first preamble format or an indication of a first cyclic shift offset for determination of a first preamble sequence, wherein the second physical random access channel configuration may comprise an indication of at least one of a second preamble format or an indication of a second cyclic shift offset for determination of a second preamble sequence, wherein the first preamble format may be at least partially different from the second preamble format, wherein the first cyclic shift offset may be at least partially different from the second cyclic shift offset, and wherein the second physical random access channel configuration may be configured to enable a longer cell range than the first physical random access channel configuration.

The physical random access channel configuration according to which the radio access preamble is received on the radio beam may comprise the second physical random access channel configuration.

The first physical random access channel configuration may be associated with an identifier of a radio beam for communicating with the apparatus directly.

The cell may comprise a plurality of radio beams, wherein the transmitted information may further comprise an indication that a subset of radio beams of the plurality of radio beams may be respectively associated with at least two physical random access channel configurations.

At least one radio beam of the plurality of radio beams may be associated with at least one single physical random access channel configuration.

Two or more physical random access channel configurations may be associated with an identifier of the radio beam on which the radio access preamble is received, wherein the two or more physical random access channel configurations may respectively indicate one or more random access channel slots that are placed at physical random access channel configuration-specific frequency areas.

The physical random access channel configuration-specific frequency areas may not overlap.

The physical random access channel configuration-specific frequency areas may partially or fully overlap.

The physical random access channel configuration-specific frequency areas may be specified with physical random access channel configuration-specific frequency offsets.

The physical random access channel configuration according to which the radio access preamble is received on the radio beam may comprise at least one of: an indication of an associated radio beam identifier, an indication of a radio access preamble format, an indication of a physical random access channel occasion, an indication of a cyclic prefix associated with the physical random access channel occasion, an indication of a sequence length associated with the physical random access channel occasion, an indication of a guard period length associated with the physical random access channel occasion, an indication of a number of physical random access channel occasions associated with a physical random access channel slot, an indication of a duration associated with the physical random access channel occasion, an indication of a cyclic shift offset, or an indication of a cyclic shift size.

In accordance with one aspect, an example method may be provided comprising: determining that a repeater may be present in a cell of a base station; transmitting, to a user equipment, information comprising at least: an indication of a first physical random access channel configuration, wherein the first physical random access channel configuration may be associated with an identifier of at least one first radio beam, and an indication of a second physical random access channel configuration, wherein the second physical random access configuration may be at least partially different from the first physical random access channel configuration, wherein the second physical random access channel configuration may be associated with an identifier of at least one second radio beam, wherein the at least one second radio beam may comprise, at least, a radio beam for communicating via the repeater; and receiving, from the user equipment, a radio access preamble on a radio beam according to a physical random access channel configuration indicated with the transmitted information.

In accordance with one example embodiment, an apparatus may comprise: circuitry configured to perform: determine that a repeater may be present in a cell of the apparatus; transmit, to a user equipment, information comprising at least: an indication of a first physical random access channel configuration, wherein the first physical random access channel configuration may be associated with an identifier of at least one first radio beam, and an indication of a second physical random access channel configuration, wherein the second physical random access configuration may be at least partially different from the first physical random access channel configuration, wherein the second physical random access channel configuration may be associated with an identifier of at least one second radio beam, wherein the at least one second radio beam may comprise, at least, a radio beam for communicating via the repeater; and receive, from the user equipment, a radio access preamble on a radio beam according to a physical random access channel configuration indicated with the transmitted information.

In accordance with one example embodiment, an apparatus may comprise: processing circuitry; memory circuitry including computer program code, the memory circuitry and the computer program code configured to, with the processing circuitry, enable the apparatus to: determine that a repeater may be present in a cell of the apparatus; transmit, to a user equipment, information comprising at least: an indication of a first physical random access channel configuration, wherein the first physical random access channel configuration may be associated with an identifier of at least one first radio beam, and an indication of a second physical random access channel configuration, wherein the second physical random access configuration may be at least partially different from the first physical random access channel configuration, wherein the second physical random access channel configuration may be associated with an identifier of at least one second radio beam, wherein the at least one second radio beam may comprise, at least, a radio beam for communicating via the repeater; and receive, from the user equipment, a radio access preamble on a radio beam according to a physical random access channel configuration indicated with the transmitted information.

In accordance with one example embodiment, an apparatus may comprise means for performing: determining that a repeater may be present in a cell of the apparatus; transmitting, to a user equipment, information comprising at least: an indication of a first physical random access channel configuration, wherein the first physical random access channel configuration may be associated with an identifier of at least one first radio beam, and an indication of a second physical random access channel configuration, wherein the second physical random access configuration may be at least partially different from the first physical random access channel configuration, wherein the second physical random access channel configuration may be associated with an identifier of at least one second radio beam, wherein the at least one second radio beam may comprise, at least, a radio beam for communicating via the repeater; and receiving, from the user equipment, a radio access preamble on a radio beam according to a physical random access channel configuration indicated with the transmitted information.

In accordance with one example embodiment, a non-transitory computer-readable medium comprising program instructions stored thereon which, when executed with at least one processor, cause the at least one processor to: determine that a repeater is present in a cell of a base station; cause transmitting, to a user equipment, of information comprising at least: an indication of a first physical random access channel configuration, wherein the first physical random access channel configuration may be associated with an identifier of at least one first radio beam, and an indication of a second physical random access channel configuration, wherein the second physical random access channel configuration may be at least partially different from the first physical random access channel configuration, wherein the second physical random access channel configuration may be associated with an identifier of at least one second radio beam, wherein the at least one second radio beam may comprise, at least, a radio beam for communicating via the repeater; and receiving, from the user equipment, a radio access preamble on a radio beam according to a physical random access channel configuration indicated with the transmitted information.

In accordance with another example embodiment, a non-transitory program storage device readable by a machine may be provided, tangibly embodying a program of instructions executable by the machine for performing operations, the operations comprising: determine that a repeater is present in a cell of a base station; cause transmitting, to a user equipment, of information comprising at least: an indication of a first physical random access channel configuration, wherein the first physical random access channel configuration may be associated with an identifier of at least one first radio beam, and an indication of a second physical random access channel configuration, wherein the second physical random access configuration may be at least partially different from the first physical random access channel configuration, wherein the second physical random access channel configuration may be associated with an identifier of at least one second radio beam, wherein the at least one second radio beam may comprise, at least, a radio beam for communicating via the repeater; and receiving, from the user equipment, a radio access preamble on a radio beam according to a physical random access channel configuration indicated with the transmitted information.

In accordance with one example embodiment, an apparatus may comprise: at least one processor; and at least one memory including computer program code; the at least one memory and the computer program code configured to, with the at least one processor, cause the apparatus at least to: receive, from a user equipment, a radio access preamble on a radio beam according to a physical random access channel configuration, wherein the physical random access channel configuration may comprise at least one of: a first physical random access channel configuration, wherein the first physical random access channel configuration may be associated with an identifier of at least one first radio beam, or a second physical random access channel configuration, wherein the second physical random access configuration may be at least partially different from the first physical random access channel configuration, wherein the second physical random access channel configuration may be associated with an identifier of at least one second radio beam, wherein the at least one second radio beam may comprise a radio beam for communicating via the apparatus; and transmit the received radio access preamble to a network node.

The first physical random access channel configuration may comprise at least one of an indication of a first preamble format or an indication of a first cyclic shift offset for determination of a first preamble sequence, wherein the second physical random access channel configuration may comprise an indication of at least one of a second preamble format or an indication of a second cyclic shift offset for determination of a second preamble sequence, wherein the first preamble format may be at least partially different from the second preamble format, wherein the first cyclic shift offset may be at least partially different from the second cyclic shift offset, and wherein the second physical random access channel configuration may be configured to enable a longer cell range than the first physical random access channel configuration.

The physical random access channel configuration according to which the radio access preamble is received on the radio beam may comprise the second physical random access channel configuration.

A cell of the network node may comprise a plurality of radio beams, wherein at least one of: the identifier of the at least one first radio beam, or the identifier of the at least one second radio beam may be associated with at least two physical random access channel configurations.

At least one of: the identifier of the at least one first radio beam, or the identifier of the at least one second radio beam may be associated with at least one single physical random access channel configuration.

Two or more physical random access channel configurations may be associated with an identifier of the radio beam on which the radio access preamble is received, wherein the two or more physical random access channel configurations may respectively indicate one or more random access channel slots that are placed at physical random access channel configuration-specific frequency areas.

The physical random access channel configuration-specific frequency areas may not overlap.

The physical random access channel configuration-specific frequency areas may partially or fully overlap.

The physical random access channel configuration-specific frequency areas may be specified with physical random access channel configuration-specific frequency offsets.

The physical random access channel configuration according to which the radio access preamble is received on the radio beam may comprise at least one of: an indication of an associated radio beam identifier, an indication of a radio access preamble format, an indication of a physical random access channel occasion, an indication of a cyclic prefix associated with the physical random access channel occasion, an indication of a sequence length associated with the physical random access channel occasion, an indication of a guard period length associated with the physical random access channel occasion, an indication of a number of physical random access channel occasions associated with a physical random access channel slot, an indication of a duration associated with the physical random access channel occasion, an indication of a cyclic shift offset, or an indication of a cyclic shift size.

In accordance with one aspect, an example method may be provided comprising: receiving, from a user equipment, a radio access preamble on a radio beam according to a physical random access channel configuration, wherein the physical random access channel configuration may comprise at least one of: a first physical random access channel configuration, wherein the first physical random access channel configuration may be associated with an identifier of at least one first radio beam, or a second physical random access channel configuration, wherein the second physical random access configuration may be at least partially different from the first physical random access channel configuration, wherein the second physical random access channel configuration may be associated with an identifier of at least one second radio beam, wherein the at least one second radio beam may comprise a radio beam for communicating via a repeater; and transmitting the received radio access preamble to a network node.

In accordance with one example embodiment, an apparatus may comprise: circuitry configured to perform: receive, from a user equipment, a radio access preamble on a radio beam according to a physical random access channel configuration, wherein the physical random access channel configuration may comprise at least one of: a first physical random access channel configuration, wherein the first physical random access channel configuration may be associated with an identifier of at least one first radio beam, or a second physical random access channel configuration, wherein the second physical random access configuration may be at least partially different from the first physical random access channel configuration, wherein the second physical random access channel configuration may be associated with an identifier of at least one second radio beam, wherein the at least one second radio beam may comprise a radio beam for communicating via the apparatus; and transmit the received radio access preamble to a network node.

In accordance with one example embodiment, an apparatus may comprise: processing circuitry; memory circuitry including computer program code, the memory circuitry and the computer program code configured to, with the processing circuitry, enable the apparatus to: receive, from a user equipment, a radio access preamble on a radio beam according to a physical random access channel configuration, wherein the physical random access channel configuration may comprise at least one of: a first physical random access channel configuration, wherein the first physical random access channel configuration may be associated with an identifier of at least one first radio beam, or a second physical random access channel configuration, wherein the second physical random access configuration may be at least partially different from the first physical random access channel configuration, wherein the second physical random access channel configuration may be associated with an identifier of at least one second radio beam, wherein the at least one second radio beam may comprise a radio beam for communicating via the apparatus; and transmit the received radio access preamble to a network node.

In accordance with one example embodiment, an apparatus may comprise means for performing: receiving, from a user equipment, a radio access preamble on a radio beam according to a physical random access channel configuration, wherein the physical random access channel configuration may comprise at least one of: a first physical random access channel configuration, wherein the first physical random access channel configuration may be associated with an identifier of at least one first radio beam, or a second physical random access channel configuration, wherein the second physical random access configuration may be at least partially different from the first physical random access channel configuration, wherein the second physical random access channel configuration may be associated with an identifier of at least one second radio beam, wherein the at least one second radio beam may comprise a radio beam for communicating via the apparatus; and transmitting the received radio access preamble to a network node.

In accordance with one example embodiment, a non-transitory computer-readable medium comprising program instructions stored thereon which, when executed with at least one processor, cause the at least one processor to: cause receiving, from a user equipment, of a radio access preamble on a radio beam according to a physical random access channel configuration, wherein the physical random access channel configuration may comprise at least one of: a first physical random access channel configuration, wherein the first physical random access channel configuration may be associated with an identifier of at least one first radio beam, or a second physical random access channel configuration, wherein the second physical random access configuration may be at least partially different from the first physical random access channel configuration, wherein the second physical random access channel configuration may be associated with an identifier of at least one second radio beam, wherein the at least one second radio beam may comprise a radio beam for communicating via a repeater; and cause transmitting of the received radio access preamble to a network node.

In accordance with another example embodiment, a non-transitory program storage device readable by a machine may be provided, tangibly embodying a program of instructions executable by the machine for performing operations, the operations comprising: cause receiving, from a user equipment, of a radio access preamble on a radio beam according to a physical random access channel configuration, wherein the physical random access channel configuration may comprise at least one of: a first physical random access channel configuration, wherein the first physical random access channel configuration may be associated with an identifier of at least one first radio beam, or a second physical random access channel configuration, wherein the second physical random access configuration may be at least partially different from the first physical random access channel configuration, wherein the second physical random access channel configuration may be associated with an identifier of at least one second radio beam, wherein the at least one second radio beam may comprise a radio beam for communicating via a repeater; and cause transmitting of the received radio access preamble to a network node.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:

at least one processor; and at least one non-transitory memory including computer program code;

the at least one memory and the computer program code configured to, with the at least one processor, cause the apparatus at least to:

receive information comprising at least:

an indication of a first physical random access channel configuration, wherein the first physical random access channel configuration is associated with an identifier of at least one first radio beam, and an indication of a second physical random access channel configuration, wherein the second physical random access configuration is at least partially different from the first physical random access channel configuration, wherein the second physical random access channel configuration is associated with an identifier of at least one second radio beam, wherein the at least one second radio beam comprises, at least, a radio beam for communicating with a network node via a repeater;

select a radio beam;

select a physical random access channel configuration based, at least partially, on the received information; and transmit, to the network node, a radio access preamble on the selected radio beam according to the selected physical random access channel configuration, wherein the first physical random access channel configuration comprises at least one of an indication of a first preamble format or an indication of a first cyclic shift offset for determination of a first preamble sequence, wherein the second physical random access channel configuration comprises an indication of at least one of a second preamble format or an indication of a second cyclic shift offset for determination of a second preamble sequence, wherein the first preamble format is at least partially different from the second preamble format, wherein the first cyclic shift offset is at least partially different from the second cyclic shift offset, and wherein the second physical random access channel configuration is configured to enable a longer cell range than the first physical random access channel configuration.

2. The apparatus of claim 1, wherein selecting the physical random access channel configuration comprises the at least one memory and the computer program code are configured to, with the at least one processor, cause the apparatus to:

select the physical random access channel configuration based, at least partially, on an identifier of the selected radio beam;

determine a physical random access channel occasion based, at least partially, on the identifier of the selected radio beam; and transmit the radio access preamble at the determined physical random access channel occasion.

3. The apparatus of claim 1, wherein selecting the physical random access channel configuration for the selected radio beam comprises the at least one memory and the computer program code are configured to, with the at least one processor, cause the apparatus to:

select the physical random access channel configuration based, at least partially, on at least one of:
the identifier of the selected radio beam,
a default configuration indicator received from the network node, or
an estimated propagation delay to the network node;
determine a physical random access channel occasion based, at least partially, on at least one of:
the identifier of the selected radio beam,
the default configuration indicator, or
the estimated propagation delay; and
transmit the radio access preamble at the determined physical random access channel occasion.

4. The apparatus of claim 1, wherein the at least one first radio beam is at least partially different from the at least one second radio beam.

5. The apparatus of claim 1, wherein the selected radio beam is associated with a synchronization signal block beam.

6. The apparatus of claim 1, wherein the selected physical random access channel configuration comprises the second physical random access channel configuration.

7. The apparatus of claim 1, wherein the identifier associated with the selected radio beam is associated with a plurality of physical random access channel configurations, wherein selecting the physical random access channel configuration comprises the at least one memory and the computer program code are configured to, with the at least one processor, cause the apparatus to:
select the physical random access channel configuration based, at least partially, on at least one criterion.

8. The apparatus of claim 1, wherein the at least one memory and the computer program code are configured to, with the at least one processor, cause the apparatus to:
select the second physical random access channel configuration as the selected physical random access channel configuration in response to a determination that the selected radio beam is received from the network node via the repeater; or
select the first physical random access channel configuration as the selected physical random access channel configuration in response to a determination that the selected radio beam is received directly from the network node, without the repeater.

9. The apparatus of claim 1, wherein a cell of the network node comprises a plurality of radio beams, wherein the received information further comprises an indication that a subset of radio beams of the plurality of radio beams are respectively associated with at least two physical random access channel configurations.

10. The apparatus of claim 9, wherein at least one radio beam of the plurality of radio beams is associated with at least one single physical random access channel configuration.

11. The apparatus of claim 1, wherein two or more physical random access channel configurations are associated with an identifier of the selected radio beam, wherein the two or more physical random access channel configurations respectively indicate one or more random access channel slots that are placed at physical random access channel configuration-specific frequency areas.

12. The apparatus of claim 11, wherein the physical random access channel configuration-specific frequency areas do not overlap.

13. The apparatus of claim 11, wherein the physical random access channel configuration-specific frequency areas partially or fully overlap.

14. The apparatus of claim 11, wherein the physical random access channel configuration-specific frequency areas are specified with physical random access channel configuration-specific frequency offsets.

15. The apparatus of claim 1, wherein the selected physical random access channel configuration comprises at least one of:
an indication of an associated radio beam identifier,
an indication of a radio access preamble format,
an indication of a physical random access channel occasion,
an indication of a cyclic prefix associated with the physical random access channel occasion,
an indication of a sequence length associated with the physical random access channel occasion,
an indication of a guard period length associated with the physical random access channel occasion,
an indication of a number of physical random access channel occasions associated with a physical random access channel slot,
an indication of a duration associated with the physical random access channel occasion,
an indication of a cyclic shift offset, or
an indication of a cyclic shift size.

16. An apparatus comprising:
at least one processor; and
at least one non-transitory memory including computer program code;
the at least one memory and the computer program code configured to, with the at least one processor, cause the apparatus at least to:
determine that a repeater is present in a cell of the apparatus;
transmit, to a user equipment, information comprising at least:
an indication of a first physical random access channel configuration,
wherein the first physical random access channel configuration is associated with an identifier of at least one first radio beam, and
an indication of a second physical random access channel configuration, wherein the second physical random access configuration is at least partially different from the first physical random access channel configuration, wherein the second physical random access channel configuration is associated with an identifier of at least one second radio beam, wherein the at least one second radio beam comprises, at least, a radio beam for communicating via the repeater; and
receive, from the user equipment, a radio access preamble on a radio beam according to a physical random access channel configuration indicated with the transmitted information,
wherein the first physical random access channel configuration comprises at least one of an indication of a first preamble format or an indication of a first cyclic shift offset for determination of a first preamble sequence,
wherein the second physical random access channel configuration comprises an indication of at least one of a second preamble format or an indication of a second cyclic shift offset for determination of a second preamble sequence,
wherein the first preamble format is at least partially different from the second preamble format,
wherein the first cyclic shift offset is at least partially different from the second cyclic shift offset, and wherein the second physical random access channel configuration is configured to enable a longer cell range than the first physical random access channel configuration.

17. The apparatus of claim 16, wherein the at least one memory and the computer program code are configured to, with the at least one processor, cause the apparatus to:

determine a location of the user equipment based, at least partially, on:

the physical random access channel configuration according to which the radio access preamble is received on the radio beam, and a physical random access channel occasion during which the radio access preamble is received on the radio beam.

18. The apparatus of claim 16, wherein the at least one first radio beam is at least partially different from the at least one second radio beam.

19. An apparatus comprising:

at least one processor; and at least one non-transitory memory including computer program code;

the at least one memory and the computer program code configured to, with the at least one processor, cause the apparatus at least to:

receive, from a user equipment, a radio access preamble on a radio beam according to a physical random access channel configuration, wherein the physical random access channel configuration comprises at least one of:

a first physical random access channel configuration, wherein the first physical random access channel configuration is associated with an identifier of at least one first radio beam, or a second physical random access channel configuration, wherein the second physical random access configuration is at least partially different from the first physical random access channel configuration, wherein the second physical random access channel configuration is associated with an identifier of at least one second radio beam, wherein the at least one second radio beam comprises a radio beam for communicating via the apparatus; and transmit the received radio access preamble to a network node, wherein the first physical random access channel configuration comprises at least one of an indication of a first preamble format or an indication of a first cyclic shift offset for determination of a first preamble sequence, wherein the second physical random access channel configuration comprises an indication of at least one of a second preamble format or an indication of a second cyclic shift offset for determination of a second preamble sequence, wherein the first preamble format is at least partially different from the second preamble format, wherein the first cyclic shift offset is at least partially different from the second cyclic shift offset, and wherein the second physical random access channel configuration is configured to enable a longer cell range than the first physical random access channel configuration.

* * * * *